(12) United States Patent
Kras

(10) Patent No.: US 12,381,904 B2
(45) Date of Patent: Aug. 5, 2025

(54) PRIORITIZATION OF REPORTED MESSAGES

(71) Applicant: KnowBe4, Inc., Clearwater, FL (US)

(72) Inventor: Greg Kras, Dunedin, FL (US)

(73) Assignee: KnowBe4, Inc., Clearwater, FL (US)

( * ) Notice: Subject to any disclaimer, the term of this patent is extended or adjusted under 35 U.S.C. 154(b) by 497 days.

(21) Appl. No.: 17/721,589

(22) Filed: Apr. 15, 2022

(65) Prior Publication Data
US 2022/0345485 A1    Oct. 27, 2022

Related U.S. Application Data

(60) Provisional application No. 63/176,616, filed on Apr. 19, 2021.

(51) Int. Cl.
*H04L 29/06* (2006.01)
*H04L 9/40* (2022.01)
*H04L 51/08* (2022.01)
*H04L 51/21* (2022.01)

(52) U.S. Cl.
CPC .......... *H04L 63/1441* (2013.01); *H04L 51/08* (2013.01); *H04L 51/21* (2022.05); *H04L 63/1433* (2013.01); *H04L 63/20* (2013.01)

(58) Field of Classification Search
None
See application file for complete search history.

(56) References Cited

U.S. PATENT DOCUMENTS

| | | |
|---|---|---|
| 8,615,807 B1 | 12/2013 | Higbee et al. |
| 8,635,703 B1 | 1/2014 | Belani et al. |
| 8,719,940 B1 | 5/2014 | Higbee et al. |
| 8,910,287 B1 | 12/2014 | Belani et al. |
| 8,966,637 B2 | 2/2015 | Belani et al. |
| 9,053,326 B2 | 6/2015 | Higbee et al. |

(Continued)

FOREIGN PATENT DOCUMENTS

| | | |
|---|---|---|
| EP | 3 582 468 A1 | 12/2019 |
| WO | WO-2016/164844 A1 | 10/2016 |

OTHER PUBLICATIONS

Ruan, Guangchen; Tan, YIng. Intelligent Detection Approaches for Spam. Third International Conference on Natural Computation (ICNC 2007). https://ieeexplore.ieee.org/stamp/stamp.jsp?tp=&arnumber=4344596 (Year: 2007).*

(Continued)

*Primary Examiner* — Jeremiah L Avery
(74) *Attorney, Agent, or Firm* — Foley & Lardner LLP

(57) ABSTRACT

Systems and methods for prioritization of reported messages and rewarding reporting users are disclosed. The systems and methods leverage knowledge and security awareness of the most informed users in an organization to protect an organization from serious harm from new malicious messages, give credit to the most informed users, and optimize threat triage and analysis. The system converts a reported malicious message to a defanged message. The system communicates the defanged message to a plurality of users. The system determines an impact score for the user based on interactions with the defanged message by the plurality of users, and with the impact score gives credit to the reporter and optimizes threat triage and analysis.

20 Claims, 10 Drawing Sheets

(56) References Cited

U.S. PATENT DOCUMENTS

| | | | |
|---|---|---|---|
| 9,246,936 B1 | 1/2016 | Belani et al. | |
| 9,253,207 B2 | 2/2016 | Higbee et al. | |
| 9,262,629 B2 | 2/2016 | Belani et al. | |
| 9,325,730 B2 | 4/2016 | Higbee et al. | |
| 9,356,948 B2 | 5/2016 | Higbee et al. | |
| 9,398,038 B2 | 7/2016 | Higbee et al. | |
| 9,591,017 B1 | 3/2017 | Higbee et al. | |
| 9,667,645 B1 | 5/2017 | Belani et al. | |
| 9,912,687 B1 | 3/2018 | Wescoe et al. | |
| 10,904,186 B1 | 1/2021 | Everton et al. | |
| 10,986,122 B2 | 4/2021 | Bloxham et al. | |
| 11,044,267 B2 | 6/2021 | Jakobsson et al. | |
| 11,184,393 B1 | 11/2021 | Gendre et al. | |
| 11,297,094 B2 | 4/2022 | Huda | |
| 2005/0064850 A1* | 3/2005 | Irlam | H04L 51/212 709/201 |
| 2007/0079379 A1* | 4/2007 | Sprosts | H04L 63/145 726/24 |
| 2007/0136808 A1* | 6/2007 | Xiong | G06F 21/566 726/22 |
| 2007/0220607 A1* | 9/2007 | Sprosts | H04L 63/123 726/24 |
| 2008/0222734 A1* | 9/2008 | Redlich | H04L 9/3271 726/26 |
| 2014/0007222 A1* | 1/2014 | Qureshi | H04L 67/10 726/16 |
| 2014/0040979 A1* | 2/2014 | Barton | H04W 12/30 726/1 |
| 2016/0164898 A1 | 6/2016 | Belani et al. | |
| 2016/0301705 A1 | 10/2016 | Higbee et al. | |
| 2019/0173819 A1 | 6/2019 | Wescoe et al. | |
| 2019/0245885 A1 | 8/2019 | Starink et al. | |
| 2020/0053111 A1* | 2/2020 | Jakobsson | H04L 63/1416 |
| 2020/0067861 A1* | 2/2020 | Leddy | G06F 21/6245 |
| 2020/0311260 A1 | 10/2020 | Klonowski et al. | |
| 2021/0058395 A1* | 2/2021 | Jakobsson | H04L 67/306 |
| 2021/0075827 A1 | 3/2021 | Grealish | |
| 2021/0136089 A1* | 5/2021 | Costea | H04L 41/22 |
| 2021/0185075 A1 | 6/2021 | Adams | |
| 2021/0194924 A1 | 6/2021 | Heinemeyer et al. | |
| 2022/0078207 A1 | 3/2022 | Chang et al. | |
| 2022/0094702 A1 | 3/2022 | Saad Ahmed et al. | |
| 2022/0100332 A1 | 3/2022 | Haworth et al. | |
| 2022/0116419 A1 | 4/2022 | Kelm et al. | |
| 2022/0130274 A1 | 4/2022 | Krishna Raju et al. | |
| 2022/0286419 A1 | 9/2022 | Stetzer et al. | |

OTHER PUBLICATIONS

Rafique, M. Zubair et al. Securing IP-Multimedia Subsystem (IMS) against Anomalous Message Exploits by Using Machine Learning Algorithms. 2011 Eighth International Conference on Information Technology: New Generations. https://ieeexplore.ieee.org/stamp/stamp.jsp?tp=&arnumber=5945297 (Year: 2011).*

Ren, Qiong et al. SEFAP: An Email System for Anti-Phishing. 6th IEEE/ACIS International Conference on Computer and Information Science (ICIS 2007). https://ieeexplore.ieee.org/stamp/stamp.jsp?tp=&arnumber=4276477 (Year: 2007).*

* cited by examiner

PRIORITIZATION OF REPORTED MESSAGES

RELATED APPLICATIONS

This patent application claims the benefit of and priority to U.S. Provisional Patent Application No. 63/176,616 titled "PRIORITIZATION OF REPORTED MESSAGES," and filed Apr. 22, 2021, the contents of all of which are hereby incorporated herein by reference in its entirety for all purposes

TECHNICAL FIELD

This disclosure generally relates to relates to managing cybersecurity threats such as phishing threats. In particular, the present disclosure relates to systems and methods for prioritization of reported messages based on impact scores of users.

BACKGROUND OF THE DISCLOSURE

Cybersecurity incidents such as phishing attacks may cost organizations in terms of loss of confidential and/or important information, and expenses in mitigating losses due to breach of confidential information. Such incidents can also cause customers to lose trust in the organization. The incidents of cybersecurity attacks and the costs of mitigating damages caused due to the incidents are increasing every year. Organizations invest in cybersecurity tools such as antivirus, anti-ransomware, anti-phishing, and other quarantine platforms. Such cybersecurity tools may detect and intercept known cybersecurity attacks. However, social engineering attacks or new threats may not be readily detectable by such tools, and the organizations rely on their employees to recognize such threats. Among the cybersecurity attacks, organizations have recognized phishing attacks as one of the most prominent threats that can cause serious breaches of data including confidential information such as intellectual property, financial information, organizational information, and other important information. Attackers who launch phishing attacks may evade an organization's security apparatuses and tools, and target its employees. To prevent or to reduce the success rate of phishing attacks on employees, organizations may conduct security awareness training programs for their employees, along with other security measures. Through the security awareness training programs, organizations actively educate their employees on how to spot and report a suspected phishing attack. As a part of a security awareness training program, an organization may execute a simulated phishing campaign for its employees, to test and develop cybersecurity awareness of the employees. In an example, the organization may execute the simulated phishing campaign through a security awareness and training system by sending out one or more simulated phishing communications periodically or occasionally to devices of employees and observe responses of employees to such simulated phishing communications. A simulated phishing communication may mimic a real phishing message and appear genuine to entice an employee to respond/interact with the simulated phishing communication. The simulated phishing communication may serve the purpose of training an employee to recognize phishing attacks and to gauge the security awareness of the employee based on an interaction of the employee with the simulated phishing communication (for example, by clicking on a link in the simulated phishing communication or opening an attachment in the simulated phishing communication) for further security awareness training. Based on the responses of the employees, the security awareness and training system may gauge the security awareness of the employee and accordingly schedule trainings based on the security awareness of the employee.

In some cases, employees of the organization may be provided with various reporting tools to support the employees to report a suspected message (potentially malicious phishing message). A Phishing Alert Button (PAB) plug-in is one example of such a tool which may be provided to employees as a part of an email client to report the suspected message. The reported message may then be forwarded to a threat detection platform and/or a security authority, for triage or quarantine and further analysis to enable the identification of potential phishing threats and malicious actors. In some examples, the employees may forward the suspected message to a specified address or a security contact point provided by the IT department. With an increasing number of cybersecurity attacks including phishing attacks, the threat detection platform and/or the security authority may receive a plethora of reports on a daily basis.

Currently, some security awareness systems calculate and provide a phish identification score for a user based on a percentage of reported suspected phishing messages that turn out to be actual phishing messages with malicious intent. Based on the user's phish identification score, the threat detection platform and/or the security authority may prioritize analysis of messages reported by the user when there are plethora of reports on a daily basis.

BRIEF SUMMARY OF THE DISCLOSURE

The disclosure generally relates to systems and methods for prioritization of reported messages based on users. In an example embodiment, a method for prioritization of reported messages based on impact scores of users is described. The method includes identifying, by one or more servers, that a message reported by a user as suspicious is a malicious message, converting, by the one or more servers, the malicious message to a defanged message that has benign elements, communicating, by the one or more servers, the defanged message to a plurality of users other than the user, determining, by the one or more servers, an impact score for the user based at least on one or more interactions with at least the benign elements of the defanged message by the plurality of users, and providing, by the one or more servers, a status to the user who reported the suspicious message based at least on the impact score.

In some implementations, the method includes converting, by the one or more servers, the malicious message to the defanged message by one or more of the following: replacing a malicious uniform resource locator (URL) with a benign URL, replacing a malicious attachment with a benign attachment, and replacing a malicious macro with a benign macro.

In some implementations, the method includes communicating, by the one or more servers, the defanged message to the plurality of users by replacing the malicious message with the defanged message in each of the mailboxes of the plurality of users.

In some implementations, the method includes tracking, by the one or more servers, one or more interactions with the defanged message by the plurality of users.

In some implementations, the method includes determining, by the one or more servers, a difficulty score for the malicious message.

In some implementations, the method includes determining, by the one or more servers, a dangerousness score for the malicious message.

In some implementations, the method includes determining, by the one or more servers, the impact score using the difficulty score for the malicious message.

In some implementations, the method includes determining, by the one or more servers, the impact score using the dangerousness score for the malicious message.

In some implementations, the method includes prioritizing, by the one or more servers, a subsequent reporting of a message as suspicious from the user in accordance with the impact score of the user.

In some implementations, the method includes receiving a report of a suspected malicious message.

In some implementations, the method includes converting a malicious message into a detonated message.

In some implementations, the method includes using the detonated message to create a defanged message. In some implementations, the method includes replacing or altering one or more malicious elements (e.g., URLs, attachments, macros, etc.) in the detonated message with benign elements that serve to educate users.

In some implementations, the method includes using the defanged message for training and gamification.

In some implementations, the method includes converting a malicious message into a defanged message when the message is determined to be the malicious message.

In some implementations, the method includes removing all the malicious elements from a malicious message to create a stripped message.

In some implementations, the method includes creating a defanged message from the stripped message, where the defanged message corresponds to the original malicious message.

In some implementations, the method includes adding benign elements to a simulated phishing template based on a defanged message at the time that the defanged message is stored. In some implementations, the method includes adding the benign elements to the defanged message when the simulated phishing template based on the defanged message is used for a simulated phishing message or a simulated phishing campaign.

In some implementations, the method includes searching mailboxes of all the users in an organization for other instances of the reported malicious message and removing the other instances of the reported malicious messages.

In some implementations, the method includes replacing the removed instances of the malicious message with the defanged message by directly injecting the defanged message into a user mailbox.

In some implementations, the method includes tracking and analyzing user interactions with the defanged message.

In some implementations, the method includes incorporating the dangerousness score into the impact score of the initial reporter.

In some implementations, the impact score of the initial reporter is a function of one or more of the difficulty score of the reported malicious message, the dangerousness score of the reported malicious message, the number of users that received the malicious message, and the number of users that interacted with a defanged malicious element "a" of severity "$severity_a$" in the defanged message.

In some implementations, the initial reporter's impact score may also be a function of the historic accuracy of the reporting of malicious messages by the initial reporter, i.e., the percentage of messages over time reported by the initial reporter as malicious messages that the threat detection platform confirmed are indeed malicious messages.

In some implementations, the method includes prioritizing analysis and triage of subsequent messages the initial reporter reports to the threat reporting platform based on the impact score.

Other aspects and advantages of the disclosure will become apparent from the following detailed description, taken in conjunction with the accompanying drawings, which illustrate by way of example the principles of the disclosure.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

For purposes of reading the description of the various embodiments below, the following descriptions of the sections of the specifications and their respective contents may be helpful:

Section A describes a network environment and computing environment which may be useful for practicing embodiments described herein.

Section B describes embodiments of systems and methods the present disclosure relates to systems and methods for prioritization of reported messages based on impact scores of users.

A. Computing and Network Environment

Figure 1A:
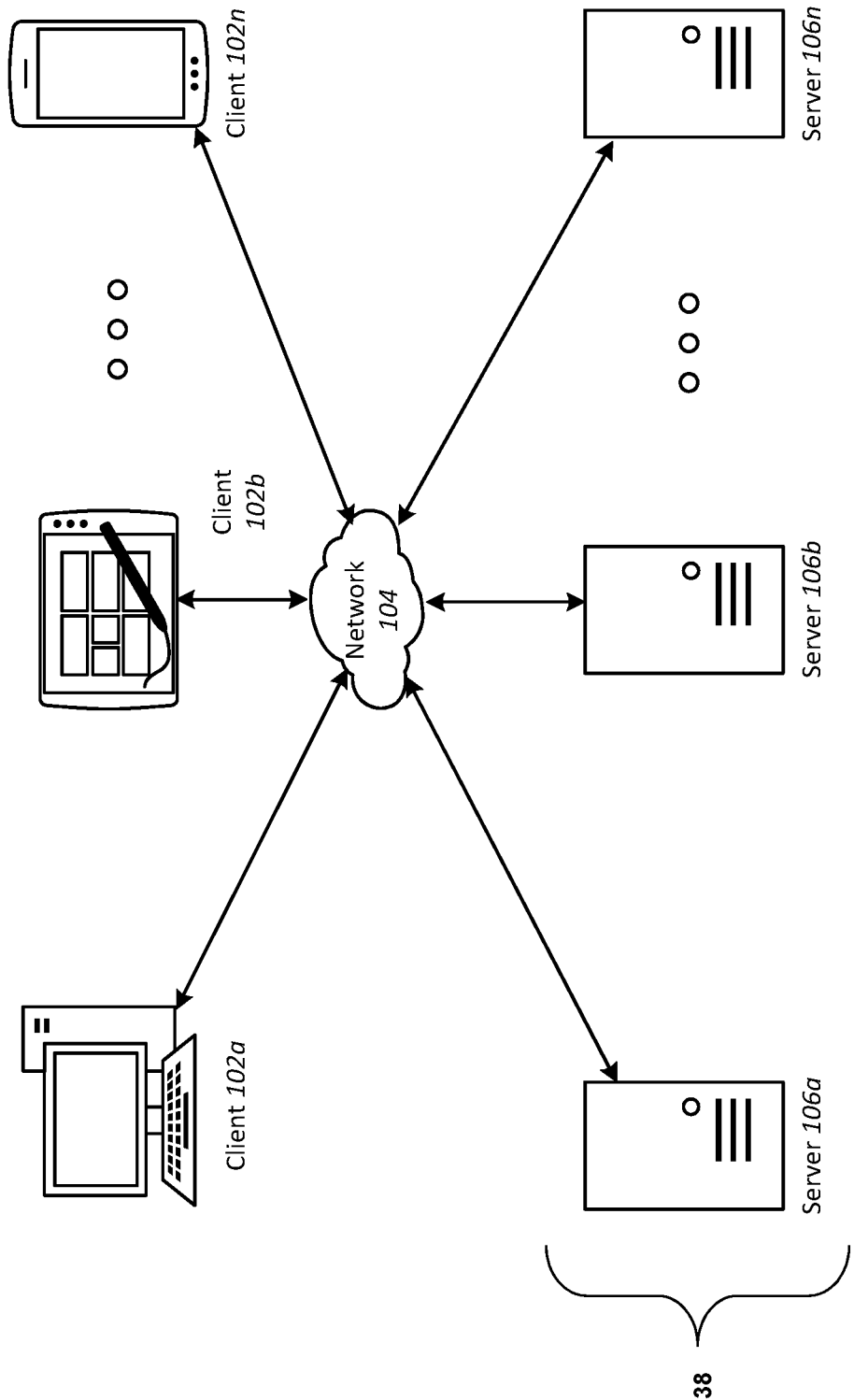
FIG. 1A is a block diagram depicting an embodiment of a network environment comprising client device in communication with server device.

Prior to discussing specific embodiments of the present solution, it may be helpful to describe aspects of the operating environment as well as associated system components (e.g. hardware elements) in connection with the methods and systems described herein. Referring to FIG. 1A, an embodiment of a network environment is depicted. In a brief overview, the network environment includes one or more clients 102a-102n (also generally referred to as local machines(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node(s) 106, machine(s) 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' may be a public network. In still another of these embodiments, networks 104 and 104' may both be private networks.

The network 104 may be connected via wired or wireless links. Wired links may include Digital Subscriber Line (DSL), coaxial cable lines, or optical fiber lines. Wireless links may include Bluetooth®, Bluetooth Low Energy (BLE), ANT/ANT+, ZigBee, Z-Wave, Thread, Wi-Fi®, Worldwide Interoperability for Microwave Access (WiMAX®), mobile WiMAX®, WiMAX®-Advanced, NFC, SigFox, LoRa, Random Phase Multiple Access (RPMA), Weightless-N/P/W, an infrared channel, or a satellite band. The wireless links may also include any cellular network standards to communicate among mobile devices, including standards that qualify as 1G, 2G, 3G, 4G, or 5G. The network standards may qualify as one or more generations of mobile telecommunication standards by fulfilling a specification or standards such as the specifications maintained by the International Telecommunication Union. The 3G standards, for example, may correspond to the International Mobile Telecommuniations-2000 (IMT-2000) specification, and the 4G standards may correspond to the International Mobile Telecommunication Advanced (IMT-Advanced) specification. Examples of cellular network standards include AMPS, GSM, GPRS, UMTS, CDMA2000, CDMA-1×RTT, CDMA-EVDO, LTE, LTE-Advanced, LTE-M1, and Narrowband IoT (NB-IoT). Wireless standards may use various channel access methods, e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv4 and IPv6), or the link layer. The network 104 may be a type of broadcast network, a telecommunications network, a data communication network, or a computer network.

In some embodiments, the system may include multiple, logically-grouped servers 106. In one of these embodiments, the logical group of servers may be referred to as a server farm or a machine farm. In another of these embodiments, the servers 106 may be geographically dispersed. In other embodiments, a machine farm may be administered as a single entity. In still other embodiments, the machine farm includes a plurality of machine farms. The servers 106 within each machine farm can be heterogeneous—one or more of the servers 106 or machines 106 can operate according to one type of operating system platform (e.g., Windows, manufactured by Microsoft Corp. of Redmond, Wash.), while one or more of the other servers 106 can operate according to another type of operating system platform (e.g., Unix, Linux, or Mac OSX).

In one embodiment, servers 106 in the machine farm may be stored in high-density rack systems, along with associated storage systems, and located in an enterprise data center. In this embodiment, consolidating the servers 106 in this way may improve system manageability, data security, the physical security of the system, and system performance by locating servers 106 and high-performance storage systems on localized high-performance networks. Centralizing the servers 106 and storage systems and coupling them with advanced system management tools allows more efficient use of server resources.

The servers 106 of each machine farm do not need to be physically proximate to another server 106 in the same machine farm. Thus, the group of servers 106 logically grouped as a machine farm may be interconnected using a wide-area network (WAN) connection or a metropolitan-area network (MAN) connection. For example, a machine farm may include servers 106 physically located in different continents or different regions of a continent, country, state, city, campus, or room. Data transmission speeds between servers 106 in the machine farm can be increased if the servers 106 are connected using a local-area network (LAN) connection or some form of direct connection. Additionally, a heterogeneous machine farm may include one or more servers 106 operating according to a type of operating system, while one or more other servers execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alta, California; the Xen hypervisor, an open source product whose development is overseen by Citrix Systems, Inc. of Fort Lauderdale, Fla.; the HYPER-V hypervisors provided by Microsoft, or others. Hosted hypervisors may run within an operating system on a second software level. Examples of hosted hypervisors may include VMWare Workstation and VirtualBox, manufactured by Oracle Corporation of Redwood City, California.

Management of the machine farm may be de-centralized. For example, one or more servers 106 may comprise components, subsystems, and modules to support one or more management services for the machine farm. In one of these embodiments, one or more servers 106 provide functionality for management of dynamic data, including techniques for handling failover, data replication, and increasing the robustness of the machine farm. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, a plurality of servers 106 may be in the path between any two communicating servers 106.

Figure 1B:
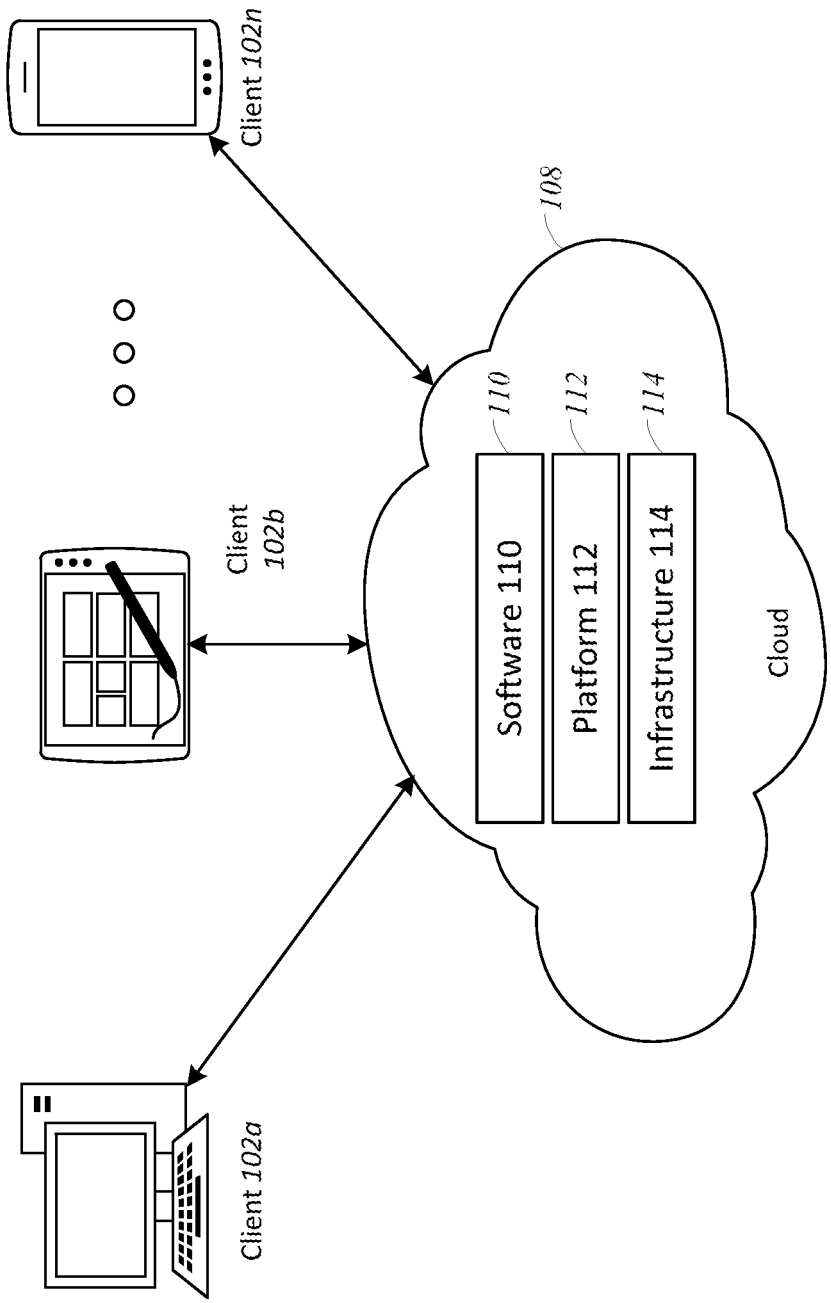
FIG. 1B is a block diagram depicting a cloud computing environment comprising client device in communication with cloud service providers.

Referring to FIG. 1B, a cloud computing environment is depicted. A cloud computing environment may provide client 102 with one or more resources provided by a network environment. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or zero client may depend on the connection to the cloud 108 or server 106 to provide functionality. A zero client may depend on the cloud 108 or other networks 104 or servers 106 to retrieve operating system data for the client device 102. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 109 may include both the private and public networks 104 and servers 106.

The cloud 108 may also include a cloud-based delivery, e.g. Software as a Service (SaaS) 110, Platform as a Service (PaaS) 112, and Infrastructure as a Service (IaaS) 114. IaaS may refer to a user renting the user of infrastructure resources that are needed during a specified time period. IaaS provides may offer storage, networking, servers, or virtualization resources from large pools, allowing the users to quickly scale up by accessing more resources as needed. Examples of IaaS include Amazon Web Services (AWS) provided by Amazon, Inc. of Seattle, Washington, Rackspace Cloud provided by Rackspace Inc. of San Antonio, Texas, Google Compute Engine provided by Google Inc. of Mountain View, California, or RightScale provided by RightScale, Inc. of Santa Barbara, California. PaaS providers may offer functionality provided by IaaS, including, e.g., storage, networking, servers, or virtualization, as well as additional resources, e.g., the operating system, middleware, or runtime resources. Examples of PaaS include Windows Azure provided by Microsoft Corporation of Redmond, Washington, Google App Engine provided by Google Inc., and Heroku provided by Heroku, Inc. of San Francisco California. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include Google Apps provided by Google Inc., Salesforce provided by Salesforce.com Inc. of San Francisco, California, or Office365 provided by Microsoft Corporation. Examples of SaaS may also include storage providers, e.g. Dropbox provided by Dropbox Inc. of San Francisco, California, Microsoft OneDrive provided by Microsoft Corporation, Google Drive provided by Google Inc., or Apple iCloud provided by Apple Inc. of Cupertino, California.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. Google Chrome, Microsoft Internet Explorer, or Mozilla Firefox provided by Mozilla Foundation of Mountain View, California). Clients 102 may also access SaaS resources through smartphone or tablet applications, including e.g., Salesforce Sales Cloud, or Google Drive App. Clients 102 may also access SaaS resources through the client operating system, including e g Windows file system for Dropbox.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (Us) or Secure Sockets Layer (SSL).

The client 102 and server 106 may be deployed as and/or executed on any type and form of computing device, e.g., a computer, network device or appliance capable of communicating on any type and form of network and performing the operations described herein.

Figure 1C:
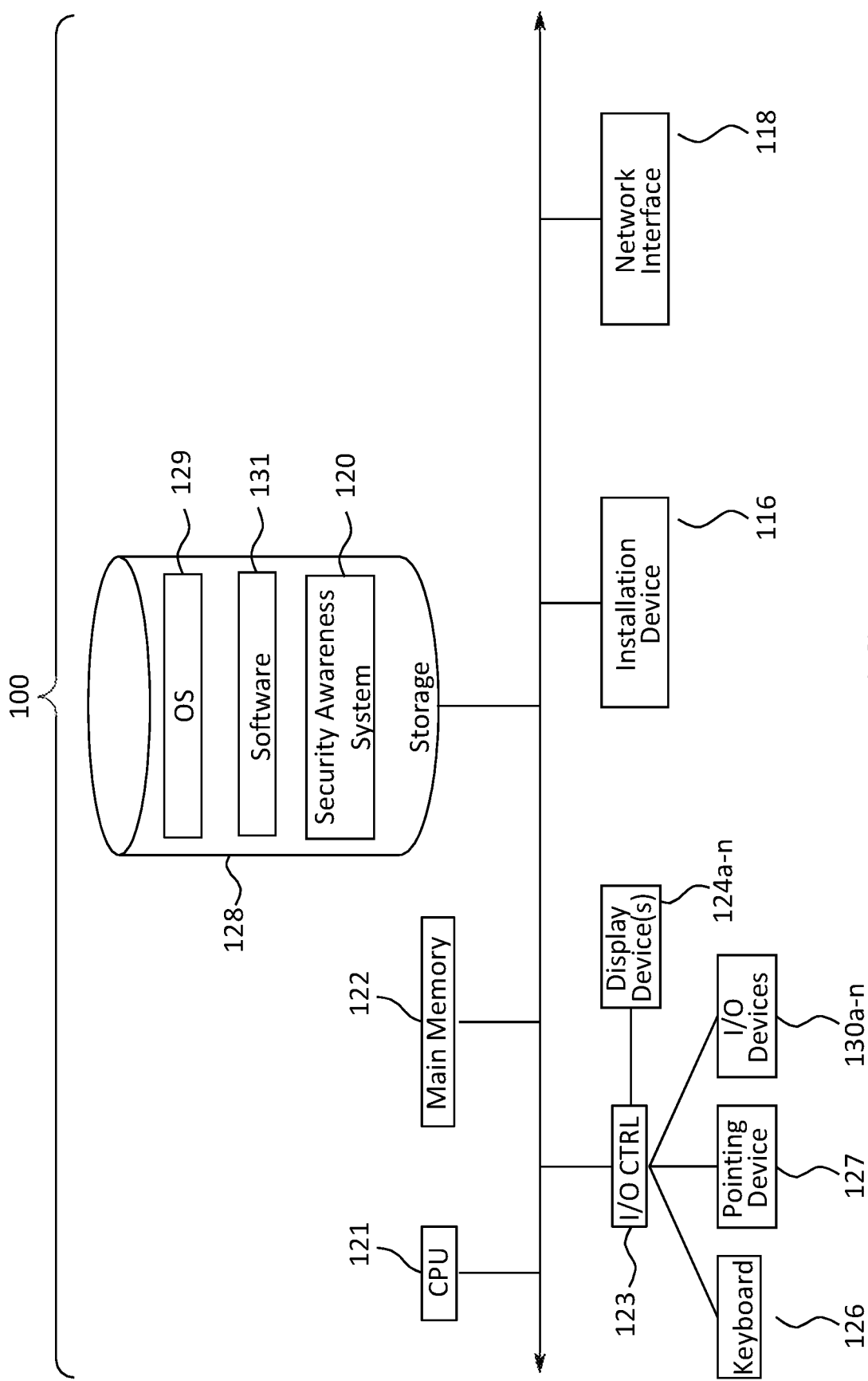
FIGS. 1C and 1D are block diagrams depicting embodiments of computing devices useful in connection with the methods and systems described herein.
Figure 1D:
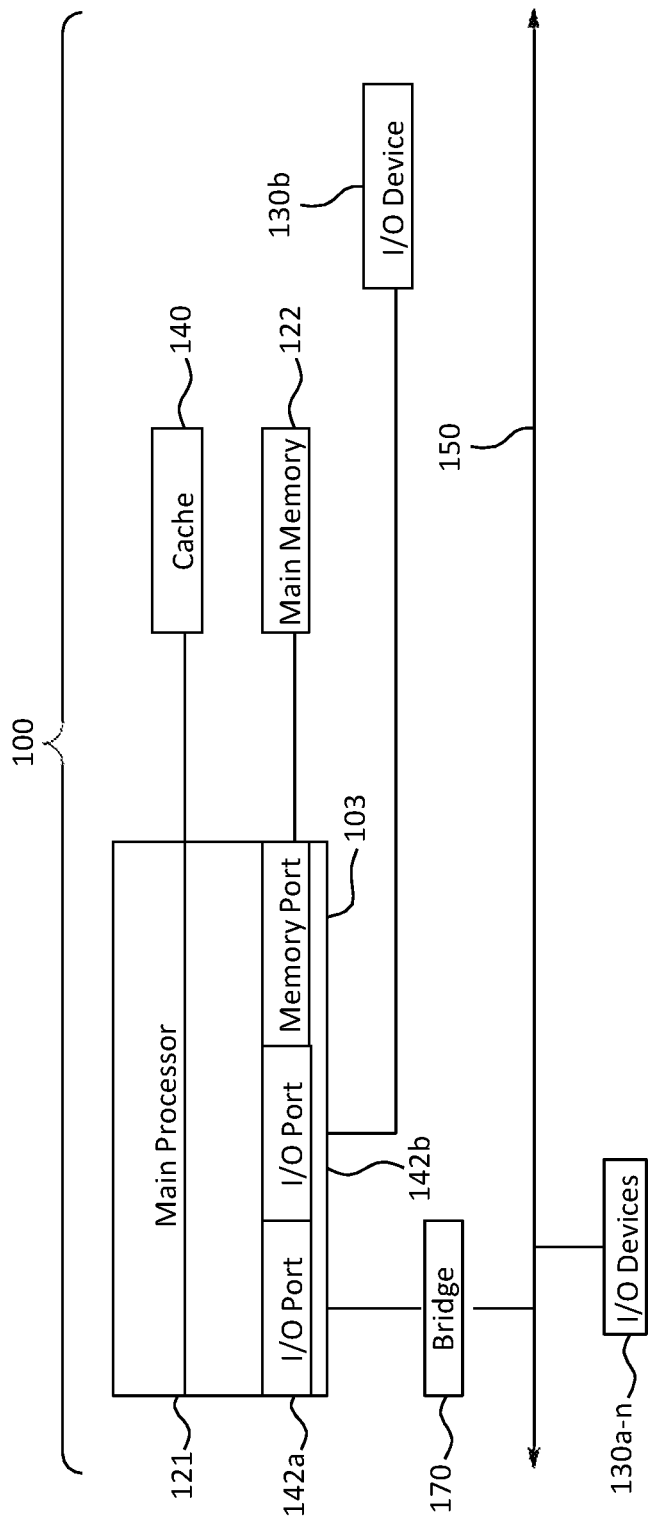

FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, and I/O controller 123, display devices 124a-124n, a keyboard 126 and a pointing device 127, e.g., a mouse. The storage device 128 may include, without limitation, an operating system 129, software 131, and a software of a security awareness system 120. As shown in FIG. 1D, each computing device 100 may also include additional optional elements, e.g., a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5 and INTEL CORE i7.

Main memory unit 122 may include on or more memory chips capable of storing data and allowing any storage location to be directly accessed by the microprocessor 121. Main memory unit 122 may be volatile and faster than storage 128 memory. Main memory units 122 may be Dynamic Random-Access Memory (DRAM) or any variants, including static Random-Access Memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts and embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, a PCI-Express bus, or a NuBus. For embodiments in which the I/O device is a video display 124, the processor 121 may use an Advanced Graphic Port (AGP) to communicate with the display 124 or the I/O controller 123 for the display 124. FIG. 1D depicts and embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex cameras (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple iPhone. Some devices 130a-130n allow gesture recognition inputs through combining some of the inputs and outputs. Some devices 130a-130n provide for facial recognition which may be utilized as an input for different purposes including authentication and other commands. Some devices 130a-130n provide for voice recognition and inputs, including, e.g., Microsoft KINECT, SIRI for iPhone by Apple, Google Now or Google Voice Search, and Alexa by Amazon.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augmented reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, a I/O device 130 may be a bridge between the system bus 150 and an external communication bus, e.g. a USB bus, a SCSI bus, a FireWire bus, an Ethernet bus, a Gigabit Ethernet bus, a Fiber Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or auto stereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect, or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments, software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the software 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via a I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116 and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, InfiniBand), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMAX, and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. The network interface 118 may comprise a built-in network adapter, network interface card, PCMCIA network card, EXPRESSCARD network card, card bus network adapter, wireless network adapter, USB network adapter, modem, or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, WINDOWS 8 and WINDOW 10, all of which are manufactured by Microsoft Corporation of Redmond, Wash.; MAC OS and iOS, manufactured by Apple, Inc.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google Inc., among others. Some operating systems, including, e.g., the CHROME OS by Google Inc., may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, or a NINTENDO DS, NINTENDO 3DS, NINTENDO WII, or a NINTENDO WII U device manufactured by Nintendo Co., Ltd., of Kyoto, Japan, or an XBOX 360 device manufactured by Microsoft Corporation.

In some embodiments, the computing device 100 is a digital audio player such as the Apple IPOD, IPOD Touch, and IPOD NANO lines of devices, manufactured by Apple Computer of Cupertino, California. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, RIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Washington. In other embodiments, the computing device 100 is an eBook reader, e.g. the KINDLE family of devices by Amazon.com, or NOOK family of devices by Barnes & Noble, Inc. of New York City, New York.

In some embodiments, the communications device 102 includes a combination of devices, e.g. a smartphone combined with a digital audio player or portable media player. For example, one of these embodiments is a smartphone, e.g. the iPhone family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, CPU, and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Systems and Methods for Prioritization of Reported Messages Based on Users

The following describes systems and methods for prioritization of reported messages based on impact scores of users. The systems and methods leverage the knowledge and security awareness of the most informed users in an organization to protect an organization from serious harm from new malicious messages, give credit to the most informed users, and optimize threat triage and analysis.

Figure 2:
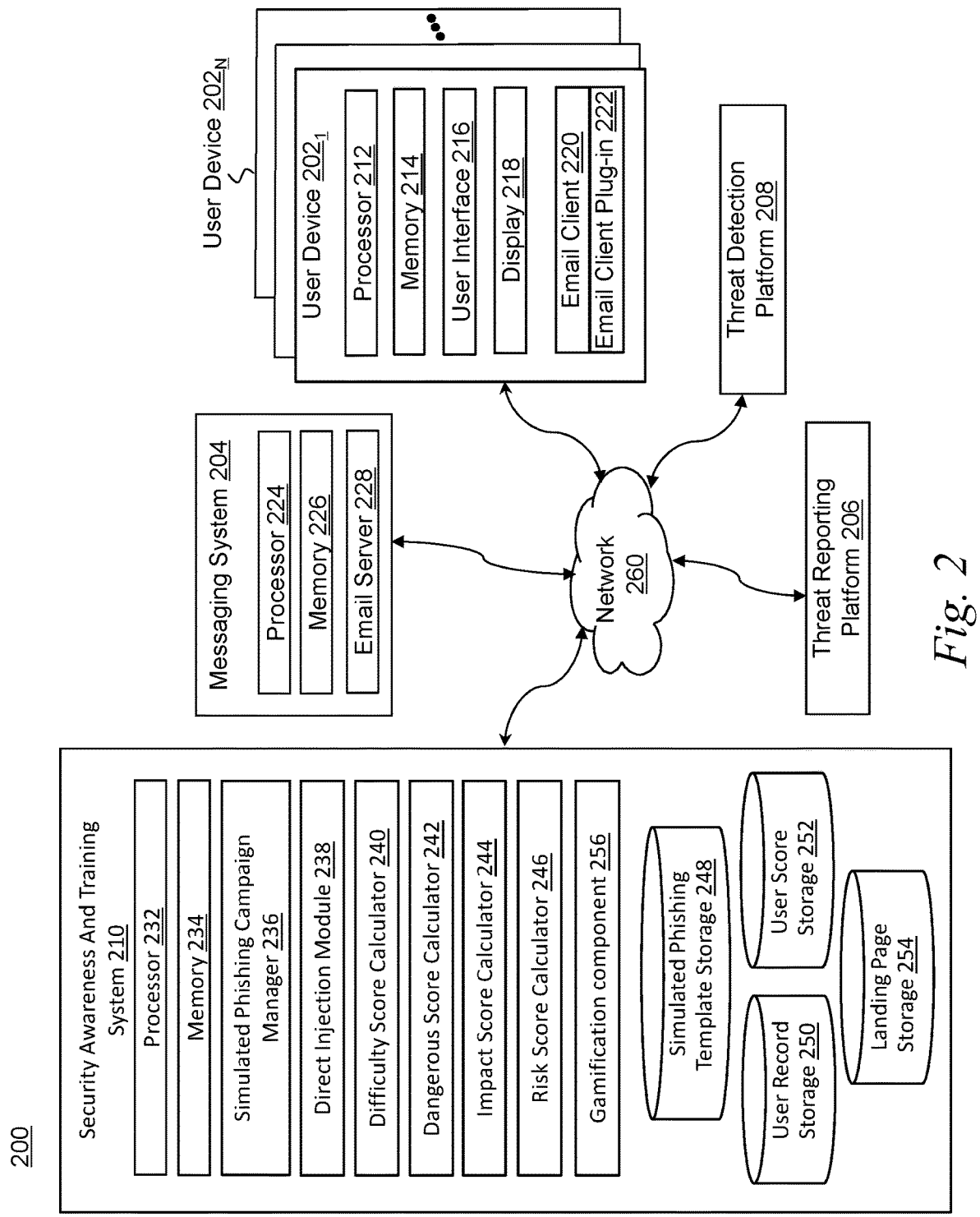
FIG. 2 depicts an implementation of some of the server architecture of a system configured to prioritize one or more reported messages based on impact scores of users, according to one embodiment.

FIG. 2 depicts some of the server architecture of an implementation of system 200 capable of prioritizing one or more reported messages based on impact scores of users, according to some embodiments. System 200 may be a part of security awareness system 120. System 200 may include user device(s) $202_{(1-N)}$, messaging system 204, threat reporting platform 206, threat detection platform 208, security awareness and training system 210, and network 260 enabling communication between the system components for information exchange. Network 260 may be an example or instance of network 104, details of which are provided with reference to FIG. 1A and its accompanying description.

According to one or more embodiments, each of messaging system 204, threat reporting platform 206, threat detection platform 208, and security awareness and training system 210 may be implemented in a variety of computing systems, such as a mainframe computer, a server, a network server, a laptop computer, a desktop computer, a notebook, a workstation, and any other computing system. In an implementation, each of messaging system 204, threat reporting platform 206, threat detection platform 208, and security awareness and training system 210 may be implemented in a server, such as server 106 shown in FIG. 1A. In some implementations, messaging system 204, threat reporting platform 206, threat detection platform 208, and security awareness and training system 210 may be implemented by a device, such as computing device 100 shown in FIGS. 1C and 1D. In some embodiments, each of messaging system 204, threat reporting platform 206, threat detection platform 208, and security awareness and training system 210 may be implemented as a part of a cluster of servers. In some embodiments, each of messaging system 204, threat reporting platform 206, threat detection platform 208, and security awareness and training system 210 may be implemented across a plurality of servers, thereby, tasks performed by each of messaging system 204, threat reporting platform 206, threat detection platform 208, and security awareness and training system 210 may be performed by the plurality of servers. These tasks may be allocated among the cluster of servers by an application, a service, a daemon, a routine, or other executable logic for task allocation. Each of messaging system 204, threat reporting platform 206, threat detection platform 208, and security awareness and training system 210 may comprise a program, service, task, script, library, application or any type and form of executable instructions or code executable on one or more processors. Each of messaging system 204, threat reporting platform 206, threat detection platform 208, and security awareness and training system 210 may be combined into one or more modules, applications, programs, services, tasks, scripts, libraries, applications, or executable code.

Referring to FIG. 2, in some embodiments, user device 202 may be any device used by a user. The user may be an employee of an organization, a client, a vendor, a customer, a contractor, or any person associated with the organization. User device 202 may be any computing device, such as a desktop computer, a laptop, a tablet computer, a mobile device, a Personal Digital Assistant (PDA), or any other computing device. In an implementation, user device 202 may be a device, such as client device 102 shown in FIG. 1A and FIG. 1B. User device 202 may be implemented by a device, such as computing device 100 shown in FIG. 1C and FIG. 1D. According to some embodiments, user device 202 may include processor 212 and memory 214. In an example, processor 212 and memory 214 of user device 202 may be CPU 121 and main memory 122, respectively, as shown in FIGS. 1C and 1D. User device 202 may also include user interface 216, such as a keyboard, a mouse, a touch screen, a haptic sensor, a voice-based input unit, or any other appropriate user interface. It shall be appreciated that such components of user device 202 may correspond to similar components of computing device 100 in FIGS. 1C and 1D, such as keyboard 126, pointing device 127, I/O devices 130a-n and display devices 124a-n. User device 202 may also include display 218, such as a screen, a monitor connected to the device in any manner, or any other appropriate display. In an implementation, user device 202 may display received content (for example, messages) for the user using display 218 and is able to accept user interaction via user interface 216 responsive to the displayed content.

In some implementations, user device 202 may include a communications module (not shown). This may be a library, an application programming interface (API), a set of scripts, or any other code that may facilitate communications between user device 202 and any of messaging system 204, threat reporting platform 206, threat detection platform 208, and security awareness and training system 210, a third-party server, or any other server. In some embodiments, the communications module determines when to transmit information from user device 202 to external servers via network 260. In some embodiments, communications module receives information from messaging system 204, threat reporting platform 206, threat detection platform 208, and/or security awareness and training system 210, via network 104. In some embodiments, the information transmitted or received by communications module may correspond to a message, such as an email, generated or received by a messaging application.

In an implementation, user device 202 may include a messaging application (not shown). A messaging application may be any application capable of viewing, editing, and/or sending messages. For example, a messaging application may be an instance of an application that allows viewing of a desired message type, such as any web browser, a Gmail™ application (Google, Mountain View, California), Microsoft Outlook™ (Microsoft, Mountain View, California), WhatsApp™ (Facebook, Menlo Park, California), a text messaging application, or any other appropriate application. In some embodiments, messaging application can be configured to display spoofed domain electronic training. In some examples, user device 202 may receive simulated phishing messages via the messaging application, display received messages for the user using display 218, and accept user interaction via user interface 216 responsive to displayed messages. In some embodiments, if the user interacts with a simulated cybersecurity attack, security awareness and training system 210 may encrypt files on user device 202.

Referring again to FIG. 2, in some embodiments, user device 202 may include email client 220. In one example implementation, email client 220 may be an application installed on user device 202. In another example implementation, email client 220 may be an application that can be accessed over network 260 without being installed on user device 202. In an implementation, email client 220 may be any application capable of composing, sending, receiving, and reading email messages. For example, email client 220 may be an instance of an application, such as Microsoft Outlook™ application, IBM® Lotus Notes® application, Apple® Mail application, Gmail® application, or any other known or custom email application. In an example, a user of user device 202 may be mandated to download and install email client 220 by the organization. In another example, email client 220 may be provided by the organization by default. In some examples, a user of user device 202 may select, purchase and/or download email client 220 through an application distribution platform. The term "application" as used herein may refer to one or more applications, services, routines, or other executable logic or instructions.

In one or more embodiments, email client 220 may include email client plug-in 222. An email client plug-in may be an application or program that may be added to an email client for providing one or more additional features or for enabling customization to existing features. For example, email client plug-in 222 may be used by the user to report suspicious emails. In an example, email client plug-in 222 may include a user interface (UI) element such as a button to trigger an underlying function. The underlying function of client-side plug-ins that use a UI button may be triggered when a user clicks the button. Some examples of client-side plug-ins that use a UI button include, but are not limited to, a Phish Alert Button (PAB) plug-in, a Report Message add-in, a task create plug-in, a spam marking plug-in, an instant message plug-in, a social media reporting plug-in and a search and highlight plug-in. In an embodiment, email client plug-in 222 may be a PAB plug-in. In some embodiments, email client plug-in 222 may be a Report Message add-in. In an example, email client plug-in 222 may be implemented in an email menu bar of email client 220. In an example, email client plug-in 222 may be implemented in a ribbon area of email client 220. In another example, email client plug-in 222 may be implemented in any area of email client 220.

In some implementations, email client plug-in 222 may not be implemented in email client 220 but may coordinate and communicate with email client 220. In some implementations, email client plug-in 222 is an interface local to email client 220 that supports email client users. In one or more embodiments, email client plug-in 222 may be an application that supports the user to report suspicious phishing communications that they believe may be a threat to them or their organization. Other implementations of email client plug-in 222 not discussed here are contemplated herein. In one example, email client plug-in 222 may enable the user to report any message (for example, a message that the user finds to be suspicious or believes to be malicious) through user action (for example, by clicking on the button). In some example implementations, email client plug-in 222 may be configured to analyze the reported message to determine whether the reported message is a simulated phishing message.

Referring again to FIG. 2, messaging system 204 may be an email handling system owned or managed or otherwise associated with an organization or any entity authorized thereof. In an implementation, messaging system 204 may be configured to receive, send, and/or relay outgoing emails (for example, simulated phishing communications) between message senders (for example, security awareness and training system 210) and recipients (for example, user device 202). Messaging system 204 may include processor 224, memory 226, and email server 228. For example, processor 224 and memory 226 of messaging system 204 may be CPU 121 and main memory 122, respectively, as shown in FIG. 1C and FIG. 1D. In an implementation, email server 228 may be any server capable of handling, receiving, and delivering emails over network 260 using one or more standard email protocols, such as Post Office Protocol 3 (POP3), Internet Message Access Protocol (IMAP), Simple Message Transfer Protocol (SMTP), and Multipurpose Internet Mail Extension (MIME) Protocol. Email server 228 may be a standalone server or a part of an organization's server. Email server 228 may be implemented using, for example, Microsoft® Exchange Server, and HCL Domino®. In an implementation, email server 228 may be a server 106 shown in FIG. 1A. Email server 228 may be implemented by a device, such as computing device 100 shown in FIG. 1C and FIG. 1D. Alternatively, email server 228 may be implemented as a part of a cluster of servers. In some embodiments, email server 228 may be implemented across a plurality of servers, thereby, tasks performed by email server 228 may be performed by the plurality of servers. These tasks may be allocated among the cluster of servers by an application, a service, a daemon, a routine, or other executable logic for task allocation. In an implementation, user device 202 may receive simulated phishing communications through email server 228 of messaging system 204.

Referring back to FIG. 2, threat reporting platform 206 may be an electronic unit that enables the user to report message(s) that the user finds to be suspicious or believes to be malicious, through email client plug-in 222. In some examples, threat reporting platform 206 is configured to manage deployment of and interactions with email client plug-in 222, allowing the user to report the suspicious messages directly from email client 220. In some example implementations, threat reporting platform 206 is configured to analyze the reported message to determine whether the reported message is a simulated phishing message. In some examples, threat reporting platform 206 may analyze the reported message to determine the presence of a header, such as a simulated phishing message X-header or other such identifiers. Threat reporting platform 206 may determine that the reported message is a simulated phishing message upon identifying the simulated phishing message X-header or other such identifiers.

Threat detection platform 208 monitors, identifies, and manages cybersecurity threats including phishing threats faced by the organization or by users of the organization. In some examples, threat detection platform 208 is configured to analyze incoming messages to messaging system 204 to detect any cyber threats such as malware. In one or more embodiments, threat detection platform 208 is configured to analyze messages forwarded by threat reporting platform 206 reported by users to detect any cybersecurity threats such as a phishing threat. Threat detection platform 208 uses information collected from identified cybersecurity threats and analyzed messages to prevent further cybersecurity threats. In examples, where a cybersecurity threat such as a phishing message or phishing attack is described, any form of cybersecurity threat may be appropriate such as a smishing or vishing cybersecurity threat.

In one or more embodiments, security awareness and training system 210 may facilitate cybersecurity awareness training, for example, via simulated phishing campaigns, computer-based trainings, remedial trainings, and risk score generation and tracking. A simulated phishing campaign is a technique of testing a user to determine whether the user is likely to recognize a true malicious phishing attack and act appropriately upon receiving the malicious phishing attack. In an implementation, security awareness and training system 210 may execute the simulated phishing campaign by sending out one or more simulated phishing messages periodically or occasionally to the users and observe responses of the users to such simulated phishing messages. A simulated phishing message may mimic a real phishing message and appear genuine to entice a user to respond to/interact with the simulated phishing message. Further, the simulated phishing message may include links, attachments, macros, or any other simulated phishing threat that resembles a real phishing threat. In an example, the simulated phishing message may be any message that is sent to a user with the intent of training him or her to recognize phishing attacks that would cause the user to reveal confidential information or otherwise compromise the security of the organization. In an example, a simulated phishing message may be an email, a Short Message Service (SMS) message, an Instant Messaging (IM) message, a voice message, or any other electronic method of communication or messaging. In some example implementations, security awareness and training system 210 may be a Computer Based Security Awareness Training (CBSAT) system that performs security services such as performing simulated phishing campaigns on a user or a set of users of an organization as a part of security awareness training.

According to some embodiments, security awareness and training system 210 may include processor 232 and memory 234. For example, processor 232 and memory 234 of security awareness and training system 210 may be CPU 121 and main memory 122, respectively, as shown in FIGS. 1C and 1D. According to an embodiment, security awareness and training system 210 may include simulated phishing campaign manager 236, direct injection module 238, difficulty score calculator 240, dangerous score calculator 242, impact score calculator 244, risk score calculator 246, simulated phishing template storage 248, user record storage 250, and landing page storage 254. Simulated phishing campaign manager 236 may include various functionalities that may be associated with cybersecurity awareness training. In an implementation, simulated phishing campaign manager 236 may be an application or a program that manages various aspects of a simulated phishing attack, for example, tailoring and/or executing a simulated phishing attack. For example, simulated phishing campaign manager 236 may monitor and control timing of various aspects of a simulated phishing attack including processing requests for access to attack results, and performing other tasks related to the management of a simulated phishing attack.

In some embodiments, simulated phishing campaign manager 236 may generate simulated phishing messages. The simulated phishing message may be a defanged message. The messages generated by simulated phishing campaign manager 236 may be of any appropriate format. For example, the messages may be email messages, text messages, short message service (SMS) messages, instant messaging (IM) messages used by messaging applications such as, e.g., WhatsApp™, or any other type of message. Message types to be used in a particular simulated phishing communication may be determined by, for example, simulated phishing campaign manager 236. The messages may be generated in any appropriate manner, e.g. by running an instance of an application that generates the desired message type, such as a Gmail® application, a Microsoft Outlook™ application, a WhatsApp™ application, a text messaging application, or any other appropriate application. In an example, simulated phishing campaign manager 236 may generate simulated phishing communications in a format consistent with specific messaging platforms, for example Outlook 365™, Outlook® Web Access (OWA), Webmail™, iOS®, Gmail®, and any other messaging platforms. The simulated phishing communications may be used in simulated phishing attacks or in simulated phishing campaigns.

In some implementations, direct injection module 238 may be configured to deliver simulated phishing communications directly to a user's mailbox. In an embodiment, direct injection module 238 may gain access to messaging system 204 in order to access the user's mailbox and directly inject simulated phishing communications into the user's mailbox. In an embodiment, direct injection module 238 may inject the simulated phishing communications into the user's mailbox via an Application Programming Interface (API) associated with messaging system 204 such as Microsoft Graph API, rather than sending it to that mailbox via SMTP. In an embodiment, by directly injecting the simulated phishing communications in the user's mailbox, the simulated phishing communications may bypass the organization's security system and are guaranteed to appear in the user's mailbox without being blocked, interacted with, and/or modified by the organization's security system.

Referring again to FIG. 2, difficulty score calculator 240 may be an application or a program configured to calculate a difficulty score of a message. The difficulty score is a metric assigned to the message that captures a difficulty that a user may have detecting whether the message is a phishing message.

Dangerous score calculator 242 may be an application or a program configured to calculate a dangerousness score of a message. The dangerousness score is a metric assigned to a message that captures a danger that a message could pose to the organization if it were interacted with.

Impact score calculator 244 may be an application or a program configured to calculate an impact score for a user. The impact score is a metric assigned to a user by the security awareness and training system 210 that captures an impact that an initial reporter has on the security of an organization with their suspicious message reporting. In examples, the impact score may be based at least in part on the difficulty score and the dangerousness score.

Referring again to FIG. 2, in some embodiments, risk score calculator 246 may be an application or a program for determining and maintaining risk scores for users of an organization. A risk score of a user may be a representation of a vulnerability of the user to a malicious attack. In an implementation, risk score calculator 246 may maintain more than one risk score for each user. Each risk score may represent the vulnerability of the user to a specific cyberattack. In an implementation, risk score calculator 246 may calculate risk scores for a group of users, the organization, an industry, a geography, or any other set or subset of users. In an example, risk score calculator 246 may modify a risk score of a user based on the user's responses to simulated phishing communications, the user's completion of cyber security training, assessed user behavior, breached information associated with the user information, completion of training by the user, a current position of the user in the organization, a size of a network of the user, an amount of time the user has held the current position in the organization, and/or any other attribute that can be associated with the user.

In some embodiments, security awareness and training system 210 may include simulated phishing template storage 248, user record storage 250, risk score storage 252, and landing page storage 254. In an implementation, simulated phishing template storage 248 may store simulated phishing communication templates, hyperlinks, attachment files, types of simulated cyberattacks, exploits, one or more categories of simulated phishing communications content, defanged messages or stripped messages, and any other content designed to test security awareness of users. User record storage 250 may store user information and one or more contextual parameters associated with each user of an organization. In some examples, the contextual parameters may be derived from a user's device, device settings, or through synchronization with an Active Directory or other repository of user data. A contextual parameter for a user may include information associated with the user that may be used to make a simulated phishing communication more relevant to that user. In an example, one or more contextual parameters for a user may include one or more of the following—language spoken by the user, locale of the user, temporal changes (for example, time at which the user changes their locale), job title of the user, job department of the user, religious beliefs of the user, topic of communication, subject of communication, name of manager or subordinate of the user, industry, address (for example, Zip Code and street), name or nickname of the user, subscriptions, preferences, recent browsing history, transaction history, recent communications with peers/managers/human resource partners/banking partners, regional currency and units, and any other information associated with the user. In some examples, user score storage 252 may store impact scores and risk scores of users.

Landing page storage 254 may store landing page templates. In an example, a landing page may be a webpage or an element of a webpage that appears in response to a user interaction such as clicking on a link or downloading an attachment) to provision training materials. The simulated phishing communication templates stored in simulated phishing template storage 248, the user information and the one or more contextual parameters for the users stored in user record storage 250, the risk scores of the users stored in user score storage 252, and the landing page templates stored in landing page storage 254 may be periodically or dynamically updated as required.

Users in an organization may receive a plurality of messages as a part of daily routine. In one example implementation, the users may receive the plurality of messages through messaging system 204. Typically, the plurality of messages are communications associated with users' professions. In an example, a group of 'N' users among the users may receive a message from a sender, such as a third-party or an unknown user, in their mailbox. In one implementation, N is at least one user. There may be a group of 'M' users in the organization who may not receive the message. In implementations, the number of users in group M is greater than or equal to zero. In an example, a section of the users (or sometimes a single user) among the group of 'N' users may find the message to be suspicious or believe the message to be potentially malicious. A malicious message may be a message that is designed to trick a user into causing the download of malicious software (for example, viruses, Trojan horses, spyware, or worms) that is of malicious intent onto a computer. A malicious message may be a message that attempts to trick the user into giving the sender unauthorized access to the user's computer systems. The malicious message may include malicious elements. The malicious elements are an aspect of the malicious message that, when interacted with, download or install malware onto a computer or provide sensitive data to an unauthorized source. Examples of malicious elements include a URL or 'link', an attachment, and a macro. Interactions may include clicking on a link, hovering over a link, copying a link, and pasting it into a browser, opening an attachment, downloading an attachment, saving an attachment, attaching an attachment to a new message, creating a copy of an attachment, executing an attachment (where the attachment is an executable file), running a macro, or otherwise interacting with a malicious element. The malware (also known as malicious software) is any software that is used to disrupt computer operations, gather sensitive information, or gain access to computer systems. A phishing attack is one form of a malicious message. Examples of malicious messages include phishing messages, smishing messages, vishing messages, malicious IM, or any other electronic message.

Referring back to users finding messages to be suspicious, one or more users may trigger a reporting of the message to threat reporting platform 206 using email client plug-in 222. In an example, a user who first reports previously unknown phishing message may be an initial reporter among the one or more users. In an example, the initial reporter may trigger the reporting of the suspicious message by interacting with email client plug-in 222. For example, the initial reporter may trigger the reporting of the suspicious message by clicking on a UI button provided by email client plug-in 222. Upon the triggering, email client plug-in 222 or email client 220 forwards the reported message or a copy of the reported message to threat reporting platform 206. Also, email client plug-in 222 or email client 220 may send a notification to security awareness and training system 210 that the initial reporter has reported a message received at his or her mailbox as suspicious or potentially malicious. Security awareness and training system 210 may acknowledge that the initial reporter has reported the message as suspicious and/or thank the initial reporter for reporting the message as suspicious through, for example, a pop-up window in email client 220.

In some examples, the initial reporter may also forward the message that the initial reporter finds to be suspicious or believes to be potentially malicious to a security authority. The security authority may be a security officer or a cyber security team having authority over security aspects within deployment of security awareness and training system 210. The security authority's responsibilities include defining simulated phishing messages (for example, determining the types of simulated malicious elements used for simulated phishing messages), and identification and classification of threats within reported emails. Examples of the security authority include but are not limited to, an IT department, a security team, a security manager, an Incident Response (IR) team, and an Artificial Intelligence (AI) or Machine Language (ML) incident handler. In some examples, a security workflow for reporting the message by forwarding the message in an organization may include instructions to forward the message identified as potentially malicious to a security authority mailbox among other options. In some examples, a record of an identity of the initial reporter the message may be captured. In an implementation, the security authority may forward the message along with the record of an identity of the initial reporter to threat reporting platform 206 for threat detection analysis. In some implementations, threat reporting platform 206 may retrieve a reported message from the security authority mailbox, any other message storage location or directly from the initial reporter's mailbox.

In one or more implementations, threat reporting platform 206 may receive the reported message. Threat reporting platform 206 may analyze the reported message to identify a simulated phishing identifier in the message. The simulated phishing identifier may be found in a message header, message body or other parts of the message. In some examples, the simulated phishing identifier are added by security awareness and training system 210 to indicate that that the message is a simulated phishing message. For example, security awareness and training system 210 may add an X-header as the simulated phishing identifier for the simulated phishing messages. On identifying the simulated phishing identifier such as the X-header in the message, threat reporting platform 206 may determine that the reported message is a simulated phishing message, and communicate to security awareness and training system 210 that the initial reporter has correctly reported a simulated phishing message. With the reported message determined to be the simulated phishing message, threat reporting platform 206 does not forward the reported message to threat detection platform 208. If results of the analysis of the reported message by threat reporting platform 206 indicates absence of simulated phishing identifiers, threat reporting platform 206 may notify security awareness and training system 210 that the reported message is not a simulated phish, and will be sent for threat detection analysis by threat detection platform 208. In some example implementations, security awareness and training system 210 may remove the reported message from the inbox of the initial reporter and move the reported message to threat detection platform 208 for the threat detection analysis.

In some example implementations, email client plug-in 222 may analyze the message to identify the simulated phishing identifier in the message. If the reported message contains the X-header or other simulated phishing identifiers, email client plug-in 222 communicates to security awareness and training system 210 that the initial reporter has correctly reported a simulated phishing message, and the reported message will not be forwarded to threat detection platform 208. In the absence of the simulated phishing identifier, the email client plug-in 222 may cause email client 220 to forward the message or a copy of the reported message to threat detection platform 208 for a threat analysis and action. In some embodiments, email client 220 or email client plug-in 222 may send a notification to security awareness and training system 210 that the initial reporter has reported a message received at his or her mailbox as suspicious or potentially malicious. Various combinations of reporting, retrieving, and forwarding the message to threat detection platform 208 not described are contemplated herein.

Threat detection platform 208 on receipt of the reported message, may perform threat analysis to determine whether the message is a phishing message. In some examples, threat detection platform 208 may analyze the reported message to identify presence of malicious elements in various portions of the reported message. The malicious elements may be present in links, attachments, macros, and other such elements. In some examples, threat detection platform 208 may identify links by analyzing hypertext reference (HREF) attributes of anchor tags in the malicious message for links. If an anchor tag does not contain a non-empty HREF attribute, threat detection platform 208 may identify text within the anchor tag as a link. In implementations, threat detection platform 208 may also process text that is not found within anchor tags and looks for any sequence of characters that could represent a web address such as text starting with http:// or https:// or www. or ending with .com, .org or other domain names. Threat detection platform 208 may use any other method as is known in the art to find and recognize links in the reported malicious message. In some examples, threat detection platform 208 may examine reported messages that include attachments. These attachments may include files in formats such as .pdf, .html, .zip, .exe, .xlsm or any other format. In some examples, threat detection platform 208 may analyze the attachments to identify a macro, or any other kind of malicious element in the malicious message. In some examples, the attachment may contain macros (for example, a spreadsheet with the extension .xlsm is macro-enabled). In one or more embodiments, threat detection platform 208 may also identify and analyze portions of the message other than the body, attachment, and link, that are not described herein.

In one or more embodiments, threat detection platform 208 may perform threat analysis on the reported message or identified portions of the reported message such as links, or attachments, using a rule set. The rule set includes one or more characteristic detection rules. Threat detection platform 208 may compile the rule set and execute the compiled rule set on the reported message or the identified portions of the message. In some examples, threat detection platform 208 may identify a combination rule comprising a plurality of characteristic detection rules to be applied against the reported message to detect characteristics of the reported message. The combination rule includes multiple characteristic detection rules combined via one or more logical operators forming an expression with a binary or "yes/no" result. An example of a characteristic detection rule is a YARA (Yet Another Recursive Algorithm) rule. Each of the characteristic detection rules include a description of a characteristic based on either a textual or a binary pattern. In some examples, for each characteristic detection rule, threat detection platform 208 generates a tag which has predetermined tag identifier, a combination rule identifier, and an index. The threat detection platform 208 may attach the tags to the characteristic detection rules of the rule set before the rule set is compiled. In some examples, threat detection platform 208 may execute the compiled rule set against the reported message to detect whether the reported message has any of the characteristics that the characteristic detection rules in the rule set test for. The execution of the compiled rule set returns the tags, the name, and the metadata for each of the characteristic detection rules in the rule set that matched against the reported message, for example which binary or textual pattern specified by the characteristic detection rule was found in the message. Based on the identification (using the tags, the name or the metadata for the characteristic detection rule, or any combination of tags, name, and metadata for the characteristic detection rule) of the returned characteristic detection rules, threat detection platform 208 may construct and evaluate a logical expression of each combination rule.

Using a result of each of the evaluated combination rule against the reported message or portions of the reported message, threat detection platform 208 may classify the reported message based on detected characteristics. For example, the result may indicate that the reported message is a malicious message, or the result may indicate that the reported message is safe and genuine.

In some examples, an index in the tag of the characteristic detection rule indicates its position in the logical expression of the combination rule that is identified by the rule identifier in the characteristic detection rule. In some examples, the tag comprises metadata associated with the characteristic detection rule which is used for its identification. In some examples, the name associated with the characteristic detection rule is used for its identification. In some examples, threat detection platform 208 may use a characteristic detection rule to detect characteristics in a predetermined portion of the reported message and different characteristic detection rules to detect characteristics in different parts of the reported message. In some examples, threat detection platform 208 may group and/or compile characteristic detection rules into the rule sets to target specific parts of the reported message such as body, subject, attachment, etc., instead of the entire message, and the compiled rule sets may only be executed against the specific part of the reported message that the complied rule sets are applicable to. In some implementations, threat detection platform 208 may compile one rule set per organization. In some examples, threat detection platform 208 may compile one rule set for each part of a reported message per organization. In some embodiments, for each characteristic detection rule, the name of the rule, the tag identifier of the rule, or the metadata associated with the rule may comprise the characteristic detection rule identifier, the combination rule identifier, and the index. The determination of whether a reported message is a malicious phishing message using a rule set of one or more characteristic detection rules is known and therefore is not explained in detail for the sake of brevity.

If threat detection platform 208 determines that the reported message is non-malicious, threat detection platform 208 may return the reported message to the initial reporter's inbox, mailbox, or other message storage location. If threat detection platform 208 determines that the reported message is a malicious message, threat detection platform 208 may send the malicious message to a sandbox or a quarantined inbox and not to the initial reporter's inbox, mailbox, or other message storage location.

Responsive to identifying the message is a malicious message, threat detection platform 208 may search for and identify one or more other malicious messages corresponding to the reported malicious message in inboxes or mailboxes of the N users that have also received the malicious message. Threat detection platform 208 or the security awareness and training system 210 may extract the identified one or more other malicious messages corresponding to the reported malicious message.

In one or more embodiments, threat detection platform 208 may convert the malicious message into a defanged message. Some non-limiting example processes for converting the malicious message into a defanged message are explained hereafter. In one embodiment, threat detection platform 208 may convert the malicious message into a detonated message. In some examples, threat detection platform 208 may convert the malicious message by rendering malicious element(s) in the malicious message harmless through 'detonation'. In one example, threat detection platform 208 may detonate the malicious message by actuating and/or removing the malicious elements such as links having harmful URLs, attachments, macros and/or other malicious elements, in a sandbox or other safe environment. Threat detection platform 208 may detonate the links in the malicious message while maintaining HREF attributes or any placeholders such that security awareness and training system 210 can locate locations of the links of the malicious message in the detonated message. Threat detection platform 208 may send the detonated message to security awareness and training system 210 for further processing.

In an embodiment, threat detection platform 208 may convert the malicious message into a stripped message. In some examples, threat detection platform 208 may covert the malicious message by stripping malicious element(s) from the malicious message. In one example, threat detection platform 208 may remove the malicious element(s) such as links or harmful URLs, attachments, and/or macros from the malicious message. Threat detection platform 208 may place placeholder(s) in the place of the removed malicious element(s). Threat detection platform 208 may send the stripped message to security awareness and training system 210.

In an embodiment, threat detection platform 208 may convert the malicious message into a defanged message. In some examples, threat detection platform 208 may 'defang' the malicious message by removing malicious element(s) such as URLs, attachments, and/or macros from the malicious message, and replacing the removed malicious element(s) with benign elements creating a simulated phishing message known as a defanged message. Examples of ways that the malicious message may be used to create a defanged message include replacing malicious URLs with benign ones, replacing malicious attachments with benign attachments, replacing malicious macros with benign macros, and replacing the REPLY TO: or FROM: address with one that redirects responses to the message to security awareness and training system 210. In one example, threat detection platform 208 may use a messages editor to remove the malicious elements, and replace the removed malicious elements with the benign elements. Threat detection platform 208 may send the defanged message to security awareness and training system 210.

In some examples, along with the detonated message, and/or stripped message, threat detection platform 208 may communicate to security awareness and training system 210 information regarding the malicious element(s) such as malicious element types so that the malicious elements can be replaced with benign elements to create the defanged message. A stripped message can be used in any place where a detonated message is described. In some examples, threat detection platform 208 may optionally select additional malicious element(s) that were not present in the malicious message, and indicate these malicious element types to security awareness and training system 210 so that security awareness and training system 210 may include benign elements corresponding to the indicated malicious element(s).

Security awareness and training system 210 may receive the detonated message, the stripped message, and/or defanged messages. In some examples, security awareness and training system 210 may use the detonated message and the stripped messages to create defanged messages. Security awareness and training system 210 may replace HREF attributes or any placeholders for attachments or macros, with benign elements for detonated or stripped malicious element(s). In one example implementation, security awareness and training system 210 may link the benign element(s) with training content or landing pages hosted by security awareness and training system 210. The benign elements, when interacted with, may direct a user to training content, for example, a landing page hosted by security awareness and training system 210. In some examples, security awareness and training system 210 may provide a benign attachment or a benign macro in place of the benign element placed by threat detection platform 208 in place of the malicious attachment or macro. The benign attachment or the benign macro when interacted with, may direct a user to training content, or may redirect the user to a landing page for security awareness when the user attempts to either save, open, or run the attachment. In some examples, the benign element attachment may be a form of document (.doc, .pdf, .html) having training benign element links. In some examples, the attachment may contain macros (for example, a spreadsheet with the extension .xlsm is macro-enabled). In some examples, the benign element is any element that does not install or download malicious malware onto a computer. Security awareness and training system 210 may replace executables with batch or binary files that, when invoked or executed, may redirect a user such that the user is provided with appropriate security awareness training. Security awareness and training system 210 may make the benign elements appear substantially similar to original malicious elements in the malicious message and make the defanged message based on the benign elements appear as much like original malicious message as possible.

In one or more embodiments, security awareness and training system 210 may create a simulated phishing template using the defanged message. The simulated phishing template may be a structured outline of a simulated phishing message that can be used multiple times to create contextualized simulated phishing messages that share the properties of the simulated phishing template but may contain dynamic content or other customizable aspects. In some examples, where the detonated message or the defanged message or the stripped message contains placeholders for specific user references or customizable content, security awareness and training system 210 may create the simulated phishing template based on the defanged message with dynamic elements or content. In some examples, security awareness and training system 210 may use the simulated phishing template based on the defanged message to create customized defanged messages. Where the malicious message does not contain any personalized links or references, security awareness and training system 210 may create a defanged message from the detonated message or stripped message that can be sent to a multitude of users and have the same effect. Such creation of a defanged message enables the defanged message to follow a general format of the malicious message but also to be customized to individual users or groups of users to make the generated simulated phishing message or simulated phishing template more contextually relevant to users. In some examples, security awareness and training system 210 may store the simulated phishing template along with the benign elements. In some examples, security awareness and training system 210 may store the simulated phishing template based on the defanged message without benign elements, and security awareness and training system 210 may add the benign elements to a simulated phishing message based on the simulated phishing template when the defanged message is created. Security awareness and training system 210 may store the simulated phishing template with or without benign elements at simulated phishing template storage 248.

In one or more embodiments, security awareness and training system 210 may deploy the defanged message to individual users or users who are a part of group, as a part of simulated phishing campaign. In some examples, security awareness and training system 210 may send the defanged message to users with a risk score or impact score below a pre-defined threshold. In some examples, the defanged message can be sent to the group of N users who have received the original malicious message (for example, users that have received the malicious message, but the malicious message was removed before the user was able to open or otherwise interact with the malicious message). In some examples, security awareness and training system 210 may directly inject the defanged message using direct injection module 238 into mailboxes of group of N users that had already received the original malicious message. The defanged message may also be directly injected into mailboxes of group of M users that did not originally receive the malicious message. In some examples, when the defanged message is directly injected into users' mailboxes, the time stamp of the defanged message is set to the same time stamp as the original malicious message (i.e., the defanged message will appear in the same place in the order of messages in the users' mailbox as the original malicious message. Security awareness and training system 210 may also deploy the defanged message by sending the defanged message (for example, via SMTP) as a regular simulated phishing message, either as a single simulated phishing message or as part of a simulated phishing campaign. In some examples, security awareness and training system 210 may generate defanged messages using the simulated phishing message template based on the malicious message, that are customized to and contextualized for a specific user or user group, for a specific industry or a company, for a specific geographic location of a company, for a size of a company, and so on. In examples, security awareness and training system 210 may send the defanged message to users who have not received the original malicious message, to train or familiarize the users with the phishing attack based on the malicious message.

Of the users that receive the defanged message, some users (X number of users) may identify the defanged message as a potential security threat and report the defanged message to threat reporting platform 206. Some users (Y number of users) may interact with the defanged message. Security awareness and training system 210 may receive and record all interactions with the defanged message.

Security awareness and training system 210 may analyze user interactions with the defanged message. In some examples, a user may interact with the defanged message itself or benign elements within the defanged message. Examples of user interactions with the defanged message or benign elements within the defanged message include a user opening the defanged message, replying to the defanged message, entering data in response to the defanged message, reporting the defanged message, deleting the defanged message, clicking on a link within the defanged message, downloading an attachment of the defanged message, enabling a macro within the defanged message, forwarding the defanged message, or any other interaction with the defanged message. In examples, defanged message interactions include a user ignoring the defanged message. In some examples, security awareness and training system 210 may aggregate data about interactions with the defanged message, or include temporal information, for example, the number of days since a user last responded, or how many instances of types of responses in the last e.g., 30 minutes, 30 days, 3 months, 1 year, etc.

Security awareness and training system 210 may record the user interactions. Security awareness and training system 210 may analyze data regarding user interactions with the defanged message. Data may include one or more identifiers of the users who interacted with the defanged message, the time and date of the interactions, whether the user interacted with a benign element, the kind of benign element the user interacted with, the kind of interaction the user had with the benign element, whether the user interacted with the defanged message, and the kind of interaction the user had with the defanged message. Security awareness and training system 210 may utilize a machine learning engine or an artificial intelligence engine for analysis of data regarding user interactions with defanged messages.

In one or more embodiments, security awareness and training system 210 may calculate a difficulty score for the malicious message. The difficulty score may be associated with the malicious message based on user interactions (e.g., how much interaction and what types of interaction other users had with the defanged message) with the defanged message, as a representation of how difficult it is for users to determine that the defanged message is a "malicious message". In examples, the greater the difficulty score of the malicious message, the less likely it is that users will detect it. In examples, a malicious message with a lower difficulty score is more likely to be detected by users. The difficulty score may also be associated with one or more versions of a malicious message. The difficulty score associated with a message may change over time. For example, a defanged message based on the malicious message may vary from user to user due to dynamic elements or content. For example, if the malicious message includes specific recipient references or customizable content, the defanged message may also contain specific recipient references or content customized to the recipient. An individual user risk score or group risk score may be used to calculate the difficulty score. Expressions below illustrate an exemplary calculation of a difficulty score of a malicious message based on interactions with the defanged message that is based on the malicious message.

Difficulty Score (DiffS) Calculation:
  Inputs: X, r, and Y;
  X=number of users that reported the defanged message;
  r=number of malicious elements in the malicious message;
  Y=number of users that interacted with the defanged message;
  Risk Score includes user risk score and group risk score.
  User Risk Score:
    Interacting Users=1 . . . p;
    Interacting User Normalized Risk scores=$R_1 \ldots R_P$
      $0 \leq R \leq 1$;

Group Risk Score:
Normalized Group Risk Score GR 0≤GR≤1;
GRp->User p's group risk score;

$$W = \frac{\left(\sum_{i=1}^{p} Ri \cdot GRi\right)}{p} \rightarrow \text{Weighted risk score;} \quad (1)$$

In examples where W=1

$$DiffS = \frac{Y \cdot r}{X \cdot W}; \quad (2)$$

As shown in (1) and (2), inputs to the difficulty score calculation may include the number of users that reported the defanged message (explained as X above). Fewer users reporting the defanged message correlates to an increased difficulty score, and more users reporting the defanged message correlates to a lower difficulty score. In other words, there is an inverse relationship between the difficulty score and the number of users that reported the defanged message.

$$DiffS \propto \frac{1}{X}; \quad (3)$$

In some examples, the number of users that reported the defanged message (X) is normalized by the number of users that received the defanged message (M+N in the example explained before).

$$DiffS \propto \frac{M+N}{X}; \quad (4)$$

An input to the difficulty score calculation may include the number of users that interacted with the defanged message (explained as Y above). Fewer users interacting with the defanged message correlates to a decreased difficulty score, and more users interacting with the defanged message correlates to an increased difficulty score. In other words, there is a direct relationship between the difficulty score and the number of users that interacted with the defanged message.

$$DiffS \propto Y; \quad (5)$$

In some examples, the number of users that interacted with the defanged message (Y) is normalized by the number of users that received the defanged message (explained as M+N above).

$$DiffS \propto \frac{Y}{M+N}; \quad (6)$$

A further input to the difficulty score is the number of malicious elements (for example, shown as r above) in the malicious message. A greater number of malicious elements r in the malicious message is directly correlated with the difficulty score.

$$DiffS \propto r; \quad (7)$$

The difficulty score may be modulated by weighted risk scores of the users that interact with the defanged message.

Let 'p' represent the $p^{th}$ user of the Y interacting users wherein (0≤p≤Y) and let Rp be the normalized user risk score of user p. (0≤Rp≤1), where 0 represents the lowest risk, and 1 represents the highest risk. In an example, if a user with low-risk score interacts with the defanged message, that should contribute more to the difficulty score than if a user with a high-risk score interacts with the defanged message. Similarly, if the user belongs to a group, the difficulty score may be further modulated by the group risk score of the user's group. For example, if the user is a member of the group "Engineering Organization" and the "Engineering Organization group risk score is high, then that user's interaction with the defanged message should contribute less to the difficulty score than the interaction of a user that is a member of the group "IT Organization" and the IT Organization group risk score is low. Let GR represent a group risk score. (0≤GR≤1), where 0 represents the lowest risk, and 1 represents the highest risk. Let GRp be the user p's group risk score. Let Wuser be the weighted user risk score.

$$Wuser \propto \frac{\left(\sum_{p=1}^{Y} Rp\right)}{Y}; \quad (8)$$

$$Wgroup \propto \frac{\left(\sum_{p=1}^{Y} GRp\right)}{Y}; \quad (9)$$

In some examples, the group and individual risk scores may be combined.

$$W \propto \frac{\left(\sum_{p=1}^{Y} Rp \cdot GRp\right)}{Y}; \quad (10)$$

As previously noted, the premise is that a low weighted risk score of the users that interact with the defanged message should contribute more to the difficulty score than a high weighted risk score of the users that interact with the defanged message.

$$DiffS \propto \frac{1}{Wuser}; \quad (11)$$

$$DiffS \propto \frac{1}{Wgroup}; \quad (12)$$

The difficulty score of a malicious message may be a function of any of the above elements alone or in combination, linearly or scaled, or using any other data regarding user interactions. Letting A represent scaling factors. As an example:

$$DiffS \propto \frac{A_Y Y \cdot A_r r}{A_X X \cdot A_{Wgroup} Wgroup \cdot A_{Wuser} Wuser \cdot A_W W}; \quad (13)$$

In examples, the difficulty score of malicious message may be adjusted over time, for example if the defanged message is used to create a simulated phishing template and that simulated phishing template is used over time on different users, then the responses of additional new users phished with the simulated phishing template based on the defanged message may be used to update the difficulty score of the malicious message. In some examples, if the difficulty score of a malicious message is revised, the impact score of the initial reporter of the malicious message may be adjusted as well.

In examples, the difficulty score of the malicious message may be raised (or lowered) when the number of users who have had an interaction with (or reported) either the defanged message or simulated phishing messages based on a simulated phishing template which was derived from the defanged message is over a certain number (for example, 50, 100, 150, 200, 500, and so on). In examples, the difficulty score is directly proportionate to the number of users with impact scores over a certain threshold who have interacted with the defanged message.

In some examples, security awareness and training system 210 may design a simulated phishing template based on the defanged message to use in generating future simulated phishing messages. The difficulty score of the original malicious message determined by user interactions with the defanged message may be assigned to the simulated phishing template that is based on the defanged message.

In some examples, security awareness and training system 210 may assign a difficulty score to a simulated phishing template based on a defanged message to determine the difficulty a user experiences recognizing the message as a simulated phishing message. Security awareness and training system 210 may use the assigned difficulty score to rank, filter, and categorize defanged messages, stripped messages and simulated phishing templates based on a defanged message to aid in selection of a simulated phishing template for a simulated phishing campaign. For example, if a simulated phishing campaign needs to have simulated phishing messages that are challenging to detect, security awareness and training system 210 may choose a simulated phishing template with a high difficulty score.

In some example implementations, security awareness and training system 210 may rank filter and categorize simulated phishing templates based on the dangerousness score associated with the simulated phishing template. For example, security awareness and training system 210 may use the dangerousness score to sort and choose simulated phishing templates for simulated phishing messages based on their dangerousness score. In some implementations, the dangerousness score may be established for a simulated phishing template based on the defanged message and then the simulated phishing template may be used again and given a new dangerousness score. Security awareness and training system 210 may track and analyze the subsequent user interactions with the simulated phishing template based on the defanged message and modify the dangerousness score of the defanged message or simulated phishing template.

In one or more embodiments, security awareness and training system 210 may calculate a dangerousness score for the malicious message as described below.

Inputs: Number of malicious elements in a malicious message (MM)=r;

$$\text{Severity} = \Sigma_{a=1}^{r}(\text{malicious element } a \text{ severity}); \quad (14)$$

$$DangS = r \cdot \text{Severity}; \quad (15)$$

The dangerousness score may denote how much damage a malicious message has the potential to cause an organization. The dangerousness score may be directly proportionate to the number of malicious elements in a malicious message. Let the number of malicious elements in the malicious message=r.

$$DangS \propto r; \quad (16)$$

The dangerousness score may be directly proportional to the severity of the malicious elements that are in the malicious message. The severity of a malicious element is a measure of the effect that interacting with the malicious element can have on the security of an organization. In some examples, the dangerousness score is high for a malicious message that has a certain number of malicious elements with high severity. In some examples, the dangerousness score is low for a message with a single malicious element and a severity within a certain threshold.

Let a represent the '$a^{th}$' malicious element, then:

$$\text{Severity} \propto \Sigma_{a=1}^{r} \text{malicious element } a \text{ severity}; \quad (17)$$

The dangerousness score of a malicious message may be a function of any of the above elements alone or in combination, linearly or scaled, or using any other data regarding the malicious elements in the malicious message. Let A represent scaling factors. As an example:

$$DangS \propto A_{severity} \text{Severity} \cdot A_r r; \quad (18)$$

The severity may be assigned to the malicious element by the security authority or by security awareness and training system 210. For example, a malicious element that can inject a virus and render a computer unusable may have a higher severity than a malicious element that attempts to steal user credentials. The dangerousness score of a malicious message may be a function of any of the above elements alone or in combination, using any data regarding user interactions.

In one or more embodiments, security awareness and training system 210 platform may calculate or update an impact score of any user, including the initial reporter as described below.

Inputs: N, DiffS, DangS, $Y_a$, Reach, G, and impact score prior to the current reporting of the malicious message;
  N=number of users that received the malicious message;
  DiffS=difficulty score of the malicious message;
  DangS—dangerousness score of the malicious message;
  $Y_a$=number of users that interacted with malicious element "a" of the defanged message;

$$\text{Reach} = \Sigma_{a=1}^{r}(f(\text{severity}_a)) \cdot (Y_a); \quad (19)$$

G—percentage of reported messages that are malicious messages;

Impact score prior to the current reporting of the malicious message;

In one embodiment, the impact score is 1 at t=0, expressed below as:

$$(ImpS_{IR})t = 1 \text{ at } t = 0; \quad (20)$$

$$(ImpS_{IR})_{t+1} = (ImpS_{IR})_{t+1} \frac{N \cdot \textit{Diffs} \cdot \textit{DangS} \cdot \text{Reach} \cdot G}{(ImpS - UID_{IR})t}; \quad (21)$$

The impact score designates the impact that the initial reporter has on preventing damage to the organization by reporting the malicious message. A user with a high impact score is a user that demonstrates a high degree of security awareness and can be relied upon to report difficult malicious messages such as zero-day threats.

The impact score may be directly proportional to the number of users that received the malicious message (as indicated by N above).

$$ImpS_{IR} \propto N; \quad (22)$$

The impact score may be directly proportional to the difficulty score of the malicious message.

$$ImpS_{IR} \propto DiffS; \quad (23)$$

The impact score may be directly proportional to the dangerousness score of the malicious message.

$$ImpS_{IR} \propto DangS; \quad (24)$$

The impact score may be directly proportional to the "Reach" of the malicious message. Let $Y_a$ be the number of users that have interacted with malicious element "a" of the defanged message. Let the severity of malicious element "a" of the malicious message be Sev–a. Then an exemplary representation of the Reach of the malicious message is:

$$Reach \propto \Sigma_{a=1}'(Sev-a) \cdot Y_a; \quad (25)$$

The impact score may be directly proportional to the accuracy of the initial reporter with respect to reporting malicious messages, where the accuracy of the initial reporter is represented by $G_{IR}$. Let the total number of messages reported by the initial reporter be T. Let the number of reported messages that are malicious messages be L.

$$G_{IR} \propto \frac{L}{T} \cdot 100\%; \quad (26)$$

The impact score of an initial reporter may be a function of any of the above elements alone or in combination, linearly or scaled, or using any other data regarding the malicious elements or the malicious message. Let A represent scaling factors. As an example:

$$(ImpS_{IR}) = A_N \cdot N \cdot A_{Diffs} Diffs \cdot A_{DangS} DangS \cdot A_{Reach} Reach \cdot A_G G; \quad (27)$$

In examples, the impact score of the initial reporter is lowered if defanged messages with a difficulty score below a certain threshold are reported by the initial reporter. In examples, the impact score is increased if the number of users who received the malicious message within the organization is above a certain threshold. In some examples, the impact score is increased if users from certain groups of users (for example, users of the group "Executives") interact with the defanged message.

In some examples, the current impact score of an initial reporter is a function of the previous impact score of the initial reporter. Let the previous impact score be $(ImpS_{IR})_t$ where t>0. Let the current impact score be $(ImpS_{IR})_{t+1}$. Then:

$$(ImpS_{IR})_{t+1} = (ImpS_{IR})_{t+1} \cdot \frac{N \cdot Diffs \cdot DangS \cdot Reach \cdot G}{(ImpS - UID_{IR})_t}; \quad (28)$$

Although the above examples explain creation of impact score for the initial reporter, one can appreciate that other users who report the malicious message that are not the initial reporter may also be assigned an impact score (or have their existing impact score updated), for example based on how many other users had already reported the malicious message before the user reported it.

Given above are non-limiting examples of the types of data related to malicious messages and interactions with a defanged messages that may be considered in creating the difficulty score, the dangerousness score, and the impact score. In some embodiments, the data may be integrated into data sets used to train machine learning models or AI models, the models configured to predict user responses to malicious messages based on the integrated data. In some embodiments, data collection is performed on an ongoing basis, and updated data and/or data sets may be used to re-train models or create new models that evolve as the data changes.

Security awareness and training system 210 may use the impact score of the initial reporter, and optionally the dangerousness score and the difficulty score of a defanged message to perform various actions. For example, for any reporting from a user having high impact score, security awareness and training system 210 may place a high priority to perform threat analysis of the reported messages. In one embodiment, based on impact scores, security awareness and training system 210 may prioritize or de-prioritize future reported messages from an initial reporter for triage and analysis in threat detection platform 208.

In one embodiment, security awareness and training system 210 may maintain a leadership board having a list of users. Security awareness and training system 210 may list the users on the leadership board on basis of their individual impact scores. In some examples, security awareness and training system 210 may assign badges and status. Badges may include awards such as 'champion', 'sharp eye' or any other displayed badge that can help a user feel recognized for their effort. In an example, the status of a user may be a ranking or a grade based on the impact score. In some embodiments, security awareness and training system 210 may provide notifications to the initial reporter of other user interactions with the defanged message based on the malicious message initial reporter reported. In some examples, users may receive notifications with the identification of the initial reporter associated with a defanged message after the users report or otherwise interact with the defanged message.

An initial reporter may be placed on a leader board and compared to other users in their organization with regards to their impact score, their risk score, or the difficulty score or dangerousness score of the malicious messages they reported. In an example, users are placed on a leader board for users who reported messages with a higher difficulty score if they report a number of defanged messages that have a difficulty score or a dangerousness score within a certain threshold. In an example, a status or badge is given to initial reporters who have an impact score over a pre-defined threshold, or who are the initial reporters of a certain number of messages that develop high difficulty scores. Security awareness and training system 210 may prioritize analysis and triage of future reported messages based on the impact score of the user.

In an example, artificial intelligence or machine learning may assign a malicious message a difficulty score or dangerousness score based on matching malicious message characteristics to characteristics of previous malicious messages or defanged messages. Threat detection platform 208 may prioritize messages for triage and analysis based on this generated difficulty score or dangerousness score. In an example, threat detection platform 208 may process two messages reported at the same time by two different users in an order that is based on the impact scores of the two users. Threat detection platform 208 may triage the reported messages and perform analysis of reported messages within the threat detection platform, and may examine individual portions of the reported messages in a sandboxed environment to detect security threats.

In an embodiment, security awareness and training system 210 may be configured so that if the impact score of the initial reporter is higher than a threshold level, the messages the initial reporter reports in the future may be prioritized for message triage and analysis over users with a lower impact score. In implementations, security awareness and training system 210 may be configured so that if the impact score of the initial reporter is higher than a pre-defined threshold, the messages that the initial reporter reports in the future may be sent to a human security authority for manual triage and analysis rather than undergoing automatic triage and analysis. In implementations, security awareness and training system 210 may be configured so that the messages the initial reporter reports in the future may be sent to a special queue of reported messages that are analyzed with one or more methods of threat detection separate from messages reported by other users.

In examples, a dangerousness score or difficulty score may be incorporated into an impact score. A risk score may be incorporated into the difficulty score. Security awareness and training system 210 may use known methods to calculate a risk score. In some examples the impact score may be a standalone score, with no correlation to the dangerousness score or difficulty score.

Using the described solution, the initial reporter is given credit (through recognition or gamification) for being the first user to detect a malicious message that is damaging to the security of an organization or difficult for other users to detect, providing motivation for users to improve their security awareness. In some examples, other reporters who are not the first to report are also given credit for reporting messages that have not yet been defanged and sent to other users. The organization benefits from the methods and system described as it enables the organization to prioritize the triage and analysis of reported messages according to the impact scores of the users that reported them, allowing the organization to address reported messages that are most likely to be the most dangerous or impactful to the organization ahead of reported messages that are less likely to be dangerous or impactful, lowering the overall security risk of the organization.

While various embodiments of score calculations have been described, these embodiments are illustrative and in no way limit the scope of the described methods of calculation of difficulty score, the dangerous score, the impact score, and the risk score calculation. Those having skill in the relevant art can effect changes to form and details of the described methods and systems without departing from the broadest scope of the described methods and systems.

Figure 3:
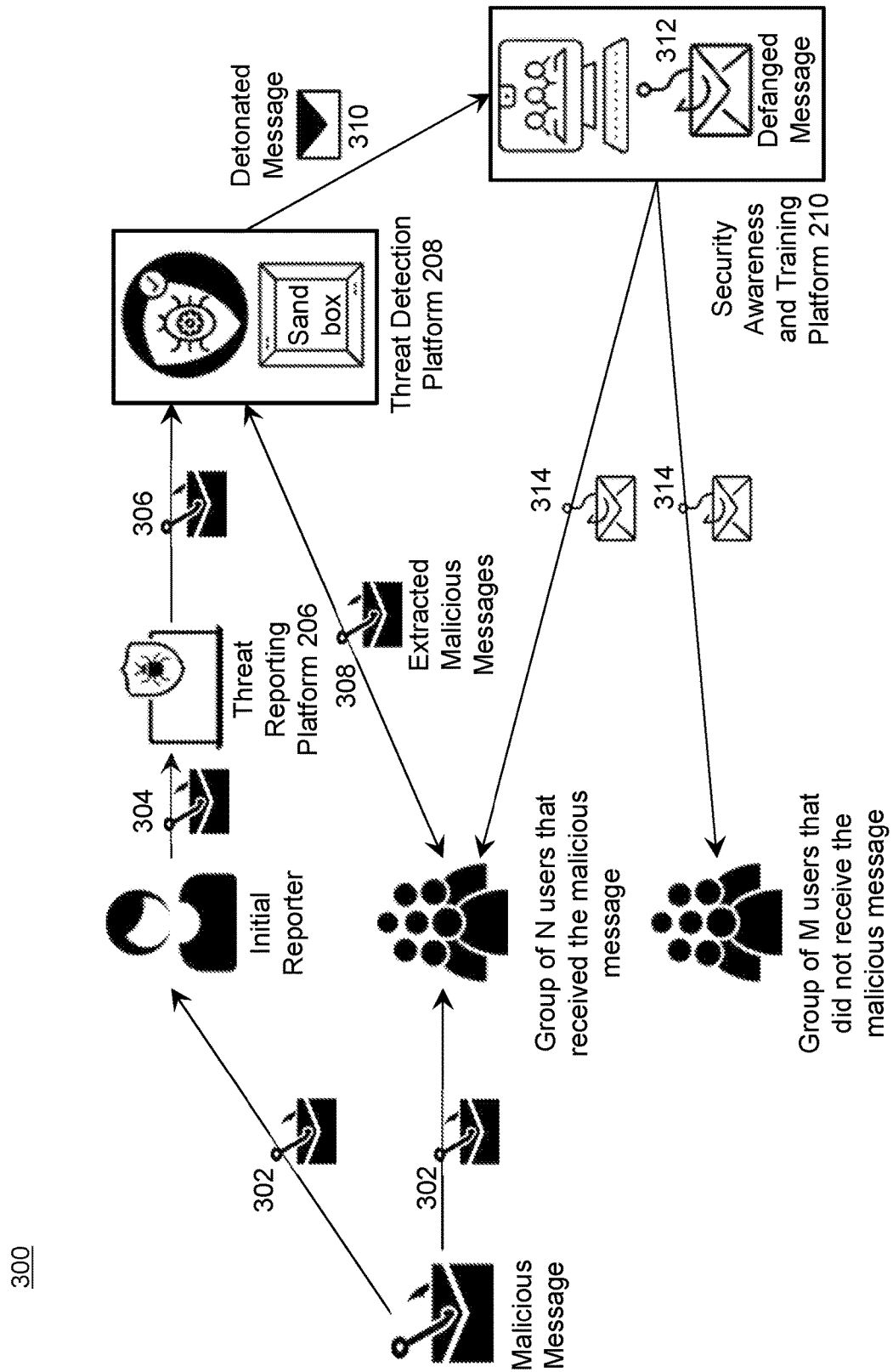
FIG. 3 depicts a process flow illustrating conversion of a malicious message to a detonated message, according to one embodiment.

FIG. 3 is a process flow 300 illustrating detonation of a malicious message, and using the detonated message to create simulated phishing messages, and communicating the simulated phishing messages to a plurality of users, according to one embodiment.

In step 302, a malicious message is sent by a sender to a user and a group of N users, of an organization.

The user may find the message to be suspicious or believe it to be malicious, and in step 304, reports the message that was previously unknown to threat reporting platform 206 before the one or more other users, thereby becoming an initial reporter.

In step 306, threat reporting platform 206 may analyze that the reported message is not a simulated phishing message and thus move the reported message to threat detection platform 208 for the threat detection analysis.

Threat detection platform 208 may analyze the reported message and determine that the reported message is a malicious message. In step 308, threat detection platform 208 may search and extract one or more other malicious messages corresponding to the reported malicious message from the mailboxes of the N users that received the malicious message. Threat detection platform 208 may place the extracted one or more other malicious messages into a quarantined inbox or a sandbox. In one embodiment, threat detection platform 208 may convert the malicious message into a detonated message. In some examples, threat detection platform 208 may convert the malicious message by rendering malicious element(s) in the malicious message harmless through detonation.

In step 310, threat detection platform 208 may send the detonated message to security awareness and training system 210. In step 312, security awareness and training system 210 may convert the detonated message into a defanged message by replacing detonated malicious elements with benign elements with training links or training materials.

In step 314, security awareness and training system 210 may communicate the defanged message to a plurality of users. The plurality of users may include a group of M users who did not receive the malicious message, and group of N users who did receive the malicious message. For the group of N users, security awareness and training system 210 may communicate the defanged message to a plurality of users by a direct injection technique where the malicious message is replaced with the defanged message in a user's mailbox.

Figure 4:
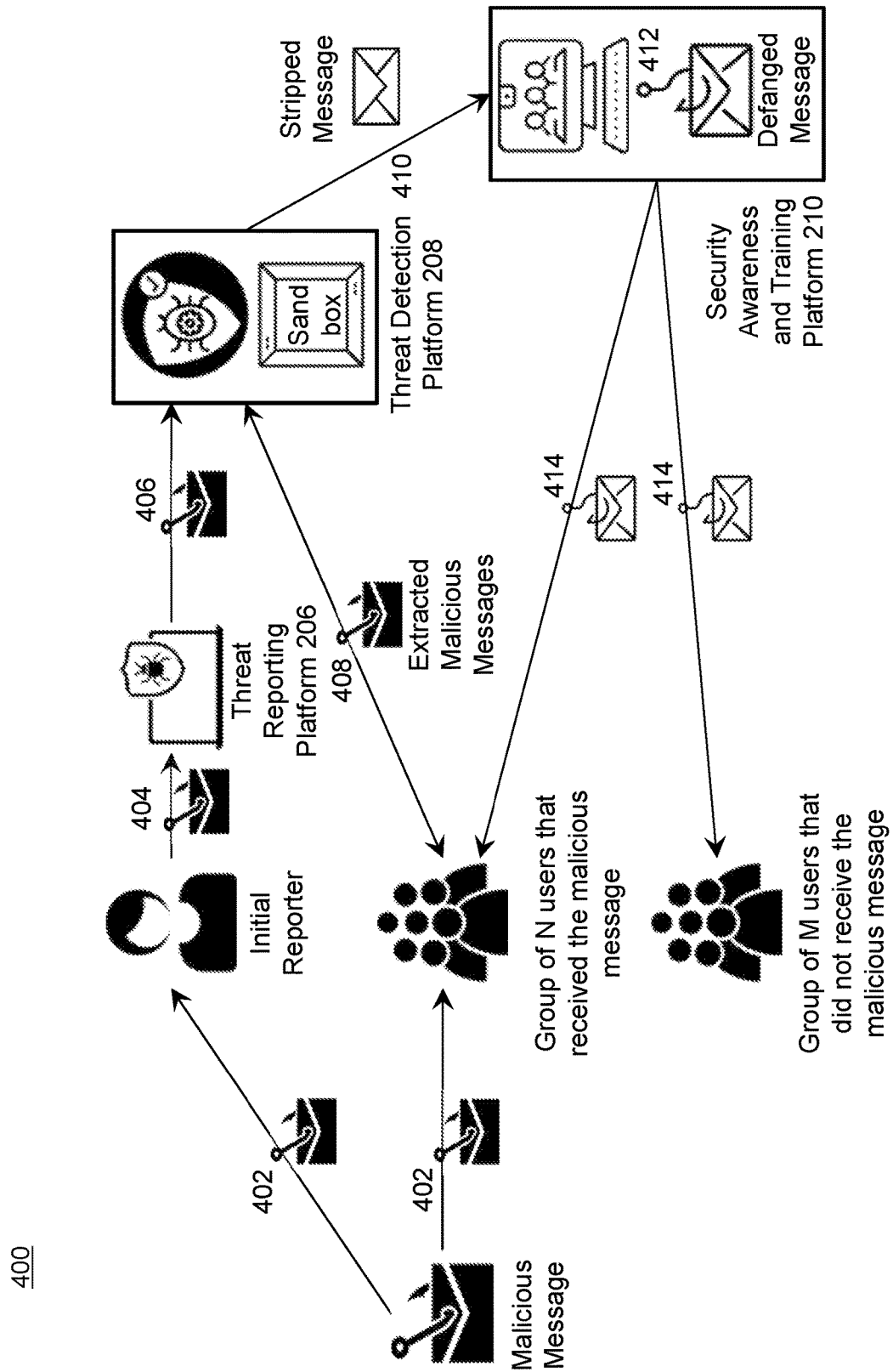
FIG. 4 depicts a process flow illustrating conversion of a malicious message to a stripped message, according to one embodiment.

FIG. 4 is a process flow 400 illustrating converting a malicious message into a stripped message, and using the stripped message to create simulated phishing messages and communicating the simulated phishing messages to a plurality of users, according to one embodiment.

In step 402, a malicious message is sent by a sender to a user and N other users in an organization.

In step 404, the user may find the message to be suspicious or believe it to be malicious, and reports the message to threat reporting platform 206 before the one or more other users, thereby becoming an initial reporter.

In step 406, threat reporting platform 206 may determine that the reported message is not a simulated phishing message and thus move the reported message to threat detection platform 208 for threat detection analysis.

Threat detection platform 208 may analyze the reported message and determine that the reported message is a malicious message. In step 408, threat detection platform 208 may search and extract one or more other malicious messages corresponding to the reported malicious message from the mailboxes of the N users who have received the malicious message. Threat detection platform 208 may place the extracted one or more other malicious messages into a quarantined inbox or a sandbox. In one embodiment, threat detection platform 208 may convert the malicious message into a stripped message. In some examples, threat detection platform 208 may strip the malicious message by removing malicious element(s) from the malicious message.

In step 410, threat detection platform 208 may send the stripped message to security awareness and training system 210. In step 412, security awareness and training system 210 may convert the stripped message into a defanged message by placing benign elements with training links or training materials in place of removed malicious element(s) or adding benign elements to the defanged message in other places.

In step 414, security awareness and training system 210 may communicate the defanged message to a plurality of users. The plurality of users may include a group of M users who did not receive the malicious message, and a group of N users who had already received the malicious message. For the group of N users, security awareness and training system 210 may communicate the defanged message to a plurality of users by a direct injection technique where the malicious message is replaced with the defanged message in a user's mailbox.

Figure 5:
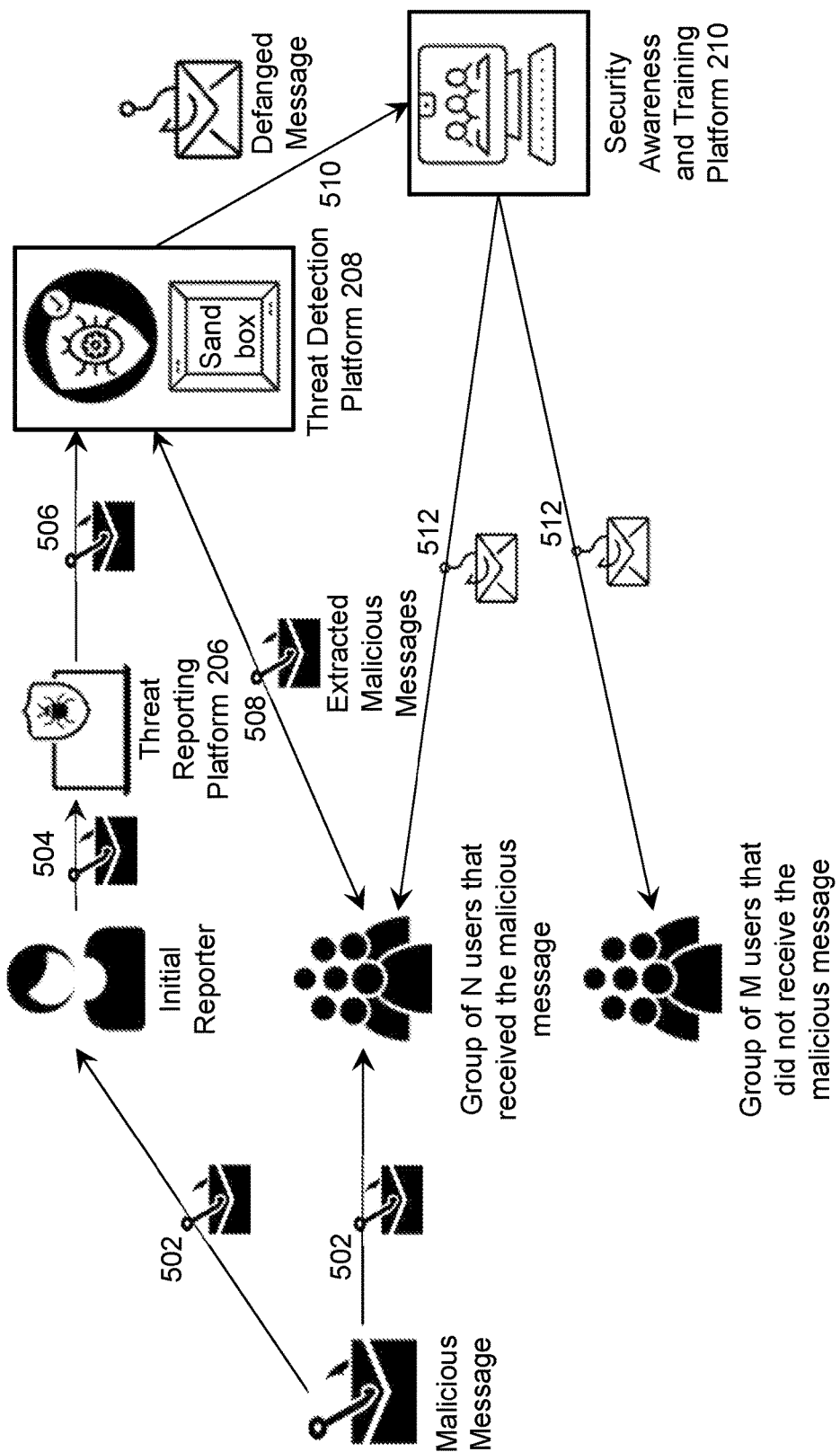
FIG. 5 depicts a process flow illustrating conversion of a malicious message to a defanged message, according to one embodiment.

FIG. 5 is a process flow 500 illustrating converting a malicious message into a defanged message, and communicating the simulated phishing messages to a plurality of users, according to one embodiment.

In step 502, a malicious message is sent by a sender to a user and N other users, of an organization.

In step 504, the user may find the message to be suspicious or believe to be malicious, and reports the message to threat reporting platform 206 before one or more other users, thereby becoming an initial reporter.

In step 506, threat reporting platform 206 may analyze that the reported message is not a simulated phishing message and thus moves the reported message to threat detection platform 208 for threat detection analysis.

Threat detection platform 208 may analyze the reported message and determine that the reported message is a malicious message. In step 508, threat detection platform 208 may search and extract one or more other malicious messages corresponding to the reported malicious message from the mailboxes of the N users who have received the malicious message. Threat detection platform 208 may place the extracted one or more other malicious messages into a quarantine inbox or a sandbox. In one embodiment, threat detection platform 208 may convert the malicious message into a defanged message. In some examples, threat detection platform 208 may process the malicious message by removing and replacing malicious element(s) in the malicious message with benign element(s).

In step 510, threat detection platform 208 may send the defanged message to security awareness and training system 210. In step 512, security awareness and training system 210 may communicate the defanged message to a plurality of users. The plurality of users may include a group of M users who did not receive the malicious message, and a group of N users who had already received the malicious message. For the group of N users, security awareness and training system 210 may communicate the defanged message to a plurality of users by a direct injection technique where the malicious message is replaced with the defanged message in the user's mailbox.

Figure 6:
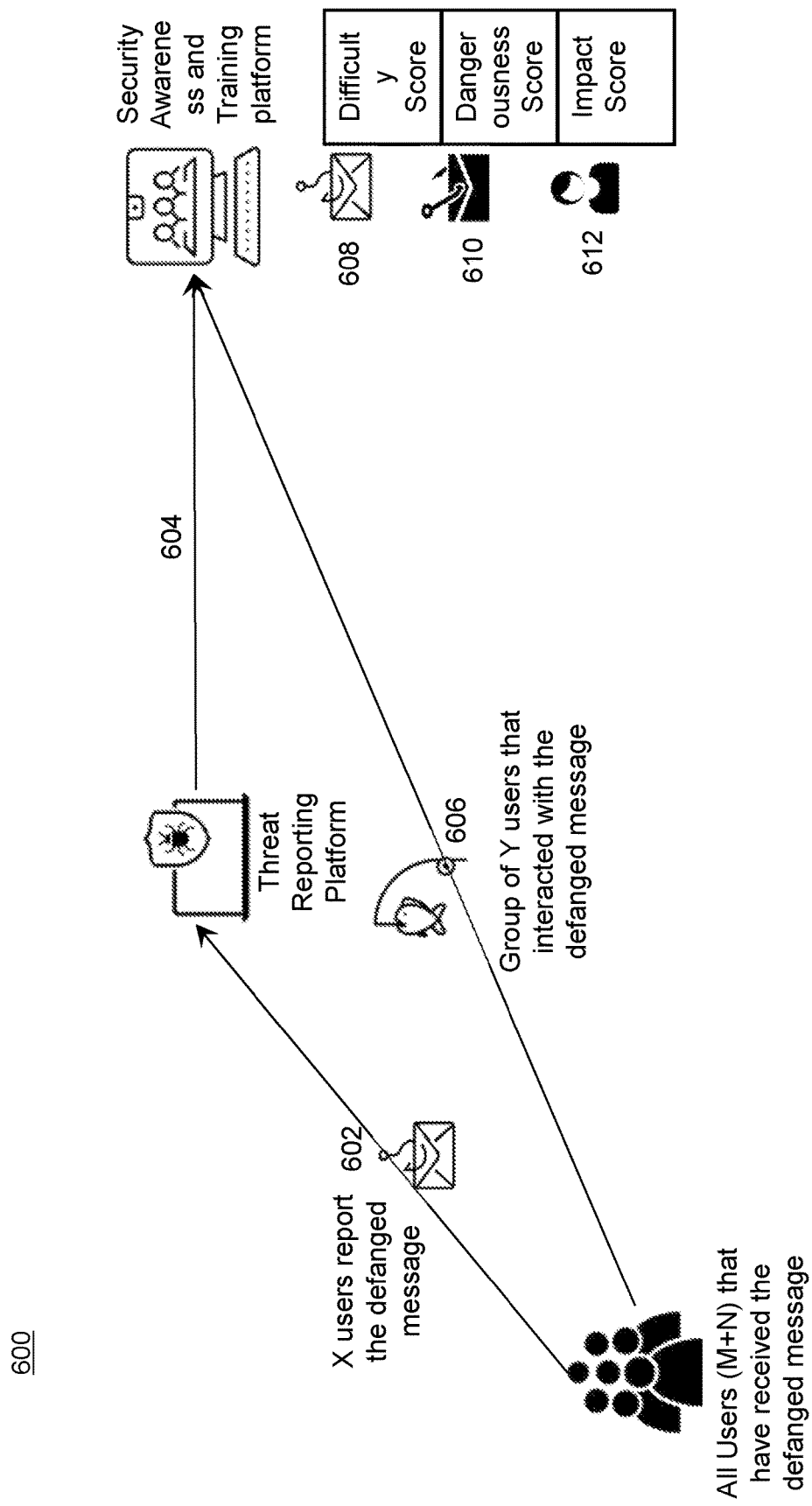
FIG. 6 depicts a process flow illustrating obtaining user interaction with the defanged message and calculating scores based on the user interaction, according to one embodiment.

FIG. 6 is a process flow 600 illustrating obtaining user interaction with a defanged message and calculating scores based on the user interaction, according to one embodiment. In brief overview of an implementation of the method of 600, at step 602, X users report the defanged message. At step 604, the threat reporting platform 206 may communicate to security awareness and training system 210 that the user has reported a simulated phishing message and the reported message will not be forwarded to threat detection platform 208. At step 606, a group of Y users interact with the defanged message. At step 608, a difficulty score is determined and at step 610, a dangerous score is determined and at step 612, an impact score is determined.

In continuation with FIG. 3, FIG. 4, and FIG. 5, where security awareness and training system 210 communicates the defanged message to a plurality of users (M+N users), in step 602, X number of users of the plurality of users report the defanged message to threat reporting platform 206 as a suspicious message. In one example, X users may use email client plug-in 222 to report the message. Threat reporting platform 206 may analyze the reported message to determine whether the reported message is a simulated phishing message. In some example implementations, threat reporting platform 206 may analyze the message to identify a simulated phishing identifier in the reported message. If the reported message has the simulated phishing identifier such as the X-header or other simulated phishing identifiers, in step 604, threat reporting platform 206 may communicate to security awareness and training system 210 that the user has correctly reported a simulated phishing message and the reported message will not be forwarded to threat detection platform 208.

In some examples, Y number of among M+N users may interact with the defanged message. In examples, the interaction may include opening the defanged message, replying to the defanged message, entering data in response to the defanged message, deleting the defanged message, forwarding the defanged message, or taking no action such as ignoring the defanged message. In step 606, security awareness and training system 210 may track such interactions and aggregate data about interactions with the defanged message.

In step 608, security awareness and training system 210 may determine or update a difficulty score for the defanged message. The difficulty score may be determined based on the X users that report the defanged messages and/or the Y users that interact with the defanged message. The security awareness and training system 210 may determine or update the difficulty score in accordance with any of the systems and methods described herein. In some cases, the difficulty score is not changed. In some implementations, the security awareness and training system 210 may determine or update the difficulty score on a predetermined frequency. In some implementations, the security awareness and training system 210 may determine or update the difficulty score as users report the defanged message and/or interact with the defanged message.

In step 610, security awareness and training system 210 may determine or update a dangerousness score. The dangerousness score may be previously established by security awareness and training system 210. The security awareness and training system 210 may determine or update the dangerousness score in accordance with any of the systems and methods described herein. In examples, the dangerousness score is determined or updated based on the number and type of benign elements in the defanged message. In some cases, the dangerousness score is not changed. In some implementations, the dangerousness score is determined responsive to any system or user events. In some implementations, the dangerousness score is determined responsive to defanging the defanged message. In some implementations, the dangerousness score is determined responsive to communicating the defanged message. In some implementations, the dangerousness score is determined responsive to a user interacting with the defanged message.

In step 612, security awareness and training system 210 may determine or update an impact score for a user. The security awareness and training system 210 may determine or update the impact score in accordance with any of the systems and methods described herein. In examples, the impact score of the X users that report a defanged message may be increased. In examples, the impact score of the Y users that interacted with the defanged message are determined or created below a pre-defined threshold. In some cases, the impact score is not changed. In examples, the impact score of the initial reporter is adjusted based on the X users that report the defanged message and/or the Y users that interact with the defanged message. In some implementations, the security awareness and training system 210 may determine or update the impact score on a predetermined frequency. In some implementations, the security awareness and training system 210 may determine or update the impact score as users report the defanged message and/or interact with the defanged message. In some implementations, the security awareness and training system 210 may determine or update the impact score responsive to or based on any changes to any other scores, such as the dangerousness score or difficult score.

Figure 7:
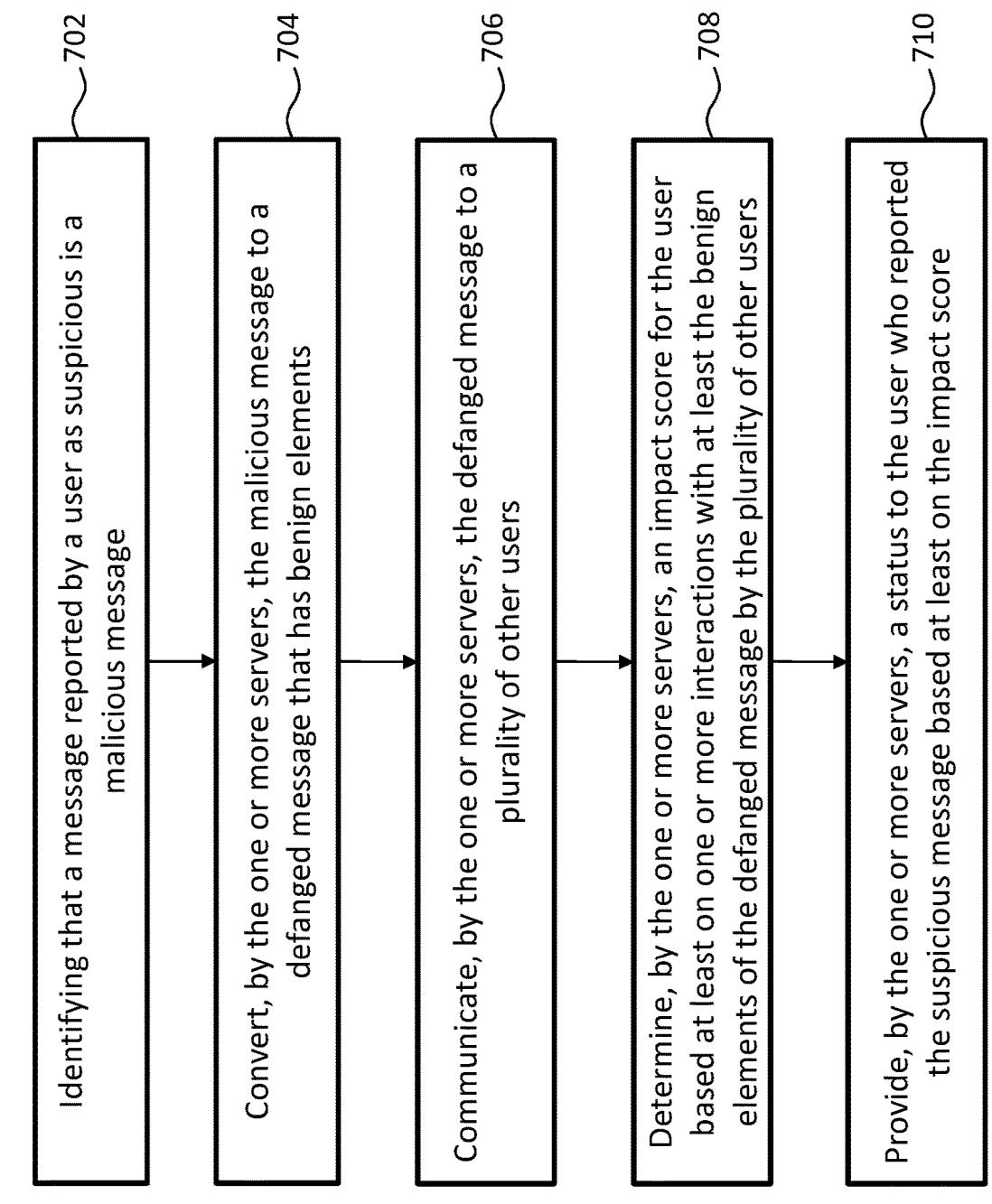
FIG. 7 depicts a process flow illustrating a determination of a status of a user, according to one embodiment.

FIG. 7 is a process flow 700 illustrating a determination of a status of a user, according to one embodiment. In brief over of an implementation of method 700, at step 702, the message reported by a user as suspicious is identified to be a malicious message. At step 704, the malicious message is converted to a defanged message that has benign elements. At step 706, the defanged message is communicated to other users. At step 707, an impact score is determined for the user based on interactions of other users with the defanged message. At step 710, a status and/or impact score is provided to the user who reported the suspicious message.

Step 702 involves identifying that a message reported by a user as suspicious is a malicious message. The security awareness and training system 210 may use any of the systems and methods described herein to determine the suspicious message is a malicious message. In some implementations, the security awareness and training system 210 may receive a report via a user that a message the user receives is suspicious. Either the client side or server side components of the security awareness and training system 210 may determine that the reported message is not a simulated phishing message generated or communicated by the system 210, and thus is a malicious message. The security awareness and training system 210 may determine that the reported message is malicious by checking, tracking or comparing the message to any databases identifying third-party malicious messages.

Step 704 involves converting the malicious message to a defanged message that has benign elements. The security awareness and training system 210 may use any of the systems and methods described herein to defang a message, covert a malicious message to a defanged message or otherwise created a benign version of the malicious message. In embodiments, the malicious message is converted by performing one or more actions including replacing a detonated uniform resource locator (URL) with a benign URL, replacing a uniform resource locator (URL) with a benign URL, replacing an attachment with a benign attachment, and replacing a disabled macro with a benign macro, or replacing any malicious element with a benign element. In examples, the malicious message is converted to a stripped message. In examples, the malicious message is stripped by performing one or more actions including removing a harmful uniform resource locator (URL), removing an attachment, disabling a macro, or removing any other malicious element. In examples, a stripped message is converted into a defanged message.

Step 706 involves communicating the defanged message to a plurality of other users. The security awareness and training system 210 may use any of the systems and methods described herein to cause the replacement of the suspicious or malicious message with the defanged message. In some cases, the suspicious or malicious message may be deleted and replaced with the defanged message. In some cases, the suspicious or malicious message may be deleted and the defanged message communicated or sent to the user. In some cases, the suspicious or malicious message may be modified or defanged in place. In examples, the message is communicated by replacing the malicious message with the defanged message in one or more mailboxes of the plurality of users. In examples, the message is communicated by replacing the malicious message with the defanged message in each of the mailboxes of the plurality of users.

Step 708 involves determining an impact score for the user based at least on one or more interactions with at least the benign elements of the defanged message by the plurality of other users. The security awareness and training system 210 may use any of the systems and methods described herein to establish, determine and/or update an impact score for any user or group of users. In examples, the interactions of users with any defanged messages are tracked. In examples, a difficulty score for the malicious message is determined. In examples, a dangerousness score for the malicious message is determined. In examples, the difficulty score and/or the dangerousness score are used in the determination of the impact score. In some examples, neither the dangerousness score nor the difficulty score is used to determine the impact score.

Step 710 involves providing a status to the user who reported the suspicious message based at least on the impact score. The security awareness and training system 210 may display the status and/or impact score to the user using any type and form of means, including but not limited to displaying on a user interface and/or sending any type and form of communication (email, text, voice, etc.). The security awareness and training system 210 may display the status and/or impact score to the user in association with the suspicious or malicious message the user reported. In examples, one or more of the status of the user or the impact score of the user are used to prioritize subsequent reporting of a message as suspicious from the user in accordance with one or more of the status of the user or the impact score of the user. In examples, one or more of the status of the user or the impact score of the user are used to prioritize subsequent processing to determine if a message is suspicious in accordance with one or more of the status of the user or the impact score of the user.

The systems described above may provide multiple examples of any or each component and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMS, RAMS, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

I claim:

1. A method comprising:
   identifying, by one or more servers, that a message reported by a user as suspicious is a malicious message;
   converting, by the one or more servers, the malicious message to a defanged message that has benign elements;
   communicating, by the one or more servers, the defanged message to a plurality of users other than the user who received the message;
   determining, by the one or more servers, an impact score for the user based at least on one or more interactions with at least the benign elements of the defanged message by the plurality of users; and
   providing, by the one or more servers, a status to the user who reported the suspicious message based at least on the impact score.

2. The method of claim 1, further comprising stripping, by the one or more servers, the malicious message.

3. The method of claim 2, further comprising stripping the malicious message by one or more of the following: removing a harmful uniform resource locator (URL), removing an attachment, and disabling a macro.

4. The method of claim 1, further comprising converting, by the one or more servers, the malicious message to the defanged message by one or more of the following: replacing a detonated uniform resource locator (URL) with a benign URL, replacing an attachment with a benign attachment, and replacing a disabled macro with a benign macro.

5. The method of claim 1, further comprising communicating, by the one or more servers, the defanged message by replacing the malicious message with the defanged message in each mailbox of the plurality of users.

6. The method of claim 1, further comprising tracking, by the one or more servers, one or more interactions with the defanged message by the plurality of users.

7. The method of claim 1, further comprising determining, by the one or more servers, a difficulty score for the malicious message.

8. The method of claim 1, further comprising determining, by the one or more servers, a dangerousness score for the malicious message.

9. The method of claim 7, further comprising determining, by the one or more servers, the impact score using one of a difficulty score or dangerousness score for the malicious message.

10. The method of claim 1, further comprising prioritizing, by the one or more servers, a subsequent reporting of a message as suspicious from the user in accordance with the impact score of the user.

11. A system comprising:
    one or more processors, coupled to memory and configured to:
    identify that a message reported by a user as suspicious is a malicious message;
    convert the malicious message to a defanged message that has benign elements;
    communicate the defanged message to a plurality of users other than the user who received the message;
    determine an impact score for the user based at least on one or more interactions with at least the benign elements of the defanged message by the plurality of users; and
    provide a status to the user who reported the suspicious message based at least on the impact score.

12. The system of claim 11, wherein the one or more processors are further configured to strip the malicious message.

13. The system of claim 12, wherein the one or more processors are further configured to strip the malicious message by one or more of the following: removing a harmful uniform resource locator (URL), removing an attachment, and disabling a macro.

14. The system of claim 11, wherein the one or more processors are further configured to convert the malicious message to the defanged message by one or more of the following: replacing a detonated uniform resource locator (URL) with a benign URL, replacing an attachment with a benign attachment, and replacing a disabled macro with a benign macro.

15. The system of claim 11, wherein the one or more processors are further configured to communicate the defanged message by replacing the malicious message with the defanged message in each mailbox of the plurality of users.

16. The system of claim 11, wherein the one or more processors are further configured to track one or more interactions with the defanged message by the plurality of users.

17. The system of claim 11, wherein the one or more processors are further configured to determine a difficulty score for the malicious message.

18. The system of claim 11, wherein the one or more processors are further configured to determine a dangerousness score for the malicious message.

19. The system of claim 17, wherein the one or more processors are further configured to determine the impact score using one of a difficulty score or dangerousness score for the malicious message.

20. The system of claim 11, wherein the one or more processors are further configured to prioritize a subsequent reporting of a message as suspicious from the user in accordance with the impact score of the user.

* * * * *